(12) United States Patent
Huang et al.

(10) Patent No.: US 11,503,605 B2
(45) Date of Patent: Nov. 15, 2022

(54) EXTREME HIGH THROUGHPUT PHYSICAL LAYER DATA RATE

(71) Applicant: Intel Corporation, Santa Clara, CA (US)

(72) Inventors: Po-Kai Huang, San Jose, CA (US); Daniel F. Bravo, Hillsboro, OR (US); Robert J. Stacey, Portland, OR (US); Laurent Cariou, Portland, OR (US); Arik Klein, Givaat Shmuel (IL)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 17/151,729

(22) Filed: Jan. 19, 2021

(65) Prior Publication Data

US 2021/0195578 A1    Jun. 24, 2021

Related U.S. Application Data

(63) Continuation of application No. 16/442,098, filed on Jun. 14, 2019, now Pat. No. 10,925,065.
(Continued)

(51) Int. Cl.
*H04W 72/04* (2009.01)
*H04L 47/36* (2022.01)
(Continued)

(52) U.S. Cl.
CPC ......... *H04W 72/048* (2013.01); *H04L 47/365* (2013.01); *H04W 28/0221* (2013.01); *H04W 28/20* (2013.01); *H04L 69/18* (2013.01)

(58) Field of Classification Search
CPC ............... H04W 72/048; H04W 28/20; H04W 28/0221; H04L 47/365
See application file for complete search history.

(56) References Cited

U.S. PATENT DOCUMENTS 10,925,065 B2  2/2021  Huang et al.
2006/0083233 A1  4/2006  Nishibayashi et al.
(Continued)

OTHER PUBLICATIONS

"U.S. Appl. No. 16/442,098, Non Final Office Action dated Jun. 8, 2020", 10 pgs.
(Continued)

*Primary Examiner* — Ayanah S George
(74) *Attorney, Agent, or Firm* — Schwegman Lundberg & Woessner, P.A.

(57) ABSTRACT

Methods, apparatuses, and computer readable media for extreme high throughput (EHT) physical layer data rate. An apparatus of an access point (AP) comprising processing circuitry configured to encode an EHT capabilities element, the EHT capabilities element comprising a maximum media access control (MAC) protocol data unit (MPDU) in an aggregated MPDU (A-MPDU) length exponent subfield. The processing circuitry further configured to configure the AP to transmit the EHT capabilities element to a station (STA), and determine a maximum A-MPDU length based on two raised to a power of a constant plus a value of the A-MPDU length exponent subfield. The processing circuitry further configured to encode MPDUs in an A-MPDU, where the A-MPDU is encoded to be less than or equal to the maximum A-MPDU length.

20 Claims, 21 Drawing Sheets

Related U.S. Application Data

(60) Provisional application No. 62/685,480, filed on Jun. 15, 2018, provisional application No. 62/685,471, filed on Jun. 15, 2018.

(51) Int. Cl.
*H04W 28/20* (2009.01)
*H04W 28/02* (2009.01)
*H04L 69/18* (2022.01)

(56) References Cited

U.S. PATENT DOCUMENTS

| | | | |
|---|---|---|---|
| 2015/0373575 A1 | 12/2015 | Smadi et al. | |
| 2017/0201343 A1* | 7/2017 | Merlin | H04L 1/1614 |
| 2017/0353887 A1* | 12/2017 | Kim | H04L 1/1685 |
| 2019/0041509 A1 | 2/2019 | Jiang et al. | |
| 2019/0364555 A1 | 11/2019 | Huang et al. | |

OTHER PUBLICATIONS

"U.S. Appl. No. 16/442,098, Notice of Allowance dated Oct. 13, 2020", 8 pgs.

"U.S. Appl. No. 16/442,098, Response filed Sep. 8, 2020 to Non Final Office Action dated Jun. 8, 2020", 9 pgs.

U.S. Appl. No. 16/442,098, U.S. Pat. No. 10,925,065, filed Jun. 14, 2019, Extreme High Throughput Physical Layer Data Rate.

\* cited by examiner

| ELEMENT ID 2502 | LENGTH 2504 | MULTI-BAND CONTROL 2506 | BAND ID 2508 | OPERATING CLASS 2510 | CHANNEL NUMBER 2512 | BSSID 2514 | BEACON INTERVAL 2516 |
|---|---|---|---|---|---|---|---|
| 1 | 1 | 1 | 1 | 1 | 1 | 6 | 2 |

| TSF OFFSET 2518 | MULTI-BAND CONNECTION CAPABILITY 2520 | FST SESSION TIMEOUT 2522 | STA MAC ADDRESS 2524 | PAIRWISE CIPHER SUITE COUNT 2526 | PAIRWISE CIPHER SUITE LIST 2528 |
|---|---|---|---|---|---|
| 1 | 1 | 1 | 0 OR 6 | 0 OR 2 | 4 X M |

OCTETS 2530

FIG. 25

| STA ROLE 2602 | STA MAC ADDRESS PRESENT 2604 | PAIRWISE CIPHER SUITE PRESENT 2606 | RESERVED 2608 |
|---|---|---|---|
| 3 | 1 | 1 | 1 |

BITS 2610

FIG. 26

| ELEMENT ID 2702 | LENGTH 2704 | ADDBA CAPABILITES 2706 | EXTENDED FIELD 2708 |
|---|---|---|---|
| 1 | 1 | 1 | VARIABLE |

OCTETS 2710

FIG. 27

EXTREME HIGH THROUGHPUT PHYSICAL LAYER DATA RATE

PRIORITY CLAIM

This application is a continuation of U.S. patent application Ser. No. 16/442,098, filed Jun. 14, 2019, which claims the benefit of priority under 35 U.S.C. 119(e) to U.S. Provisional Patent Application Ser. No. 62/685,471, filed Jun. 15, 2018, and to U.S. Provisional Patent Application Ser. No. 62/685,480, filed Jun. 15, 2018, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to media access control (MAC) layers for an extreme high throughput physical layer date rate.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 25 illustrates a multi-band element format, in accordance with some embodiments;

FIG. 26 illustrates a multi-band control field format, in accordance with some embodiments;

FIG. 27 illustrates an add BA (ADDBA) extension element, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
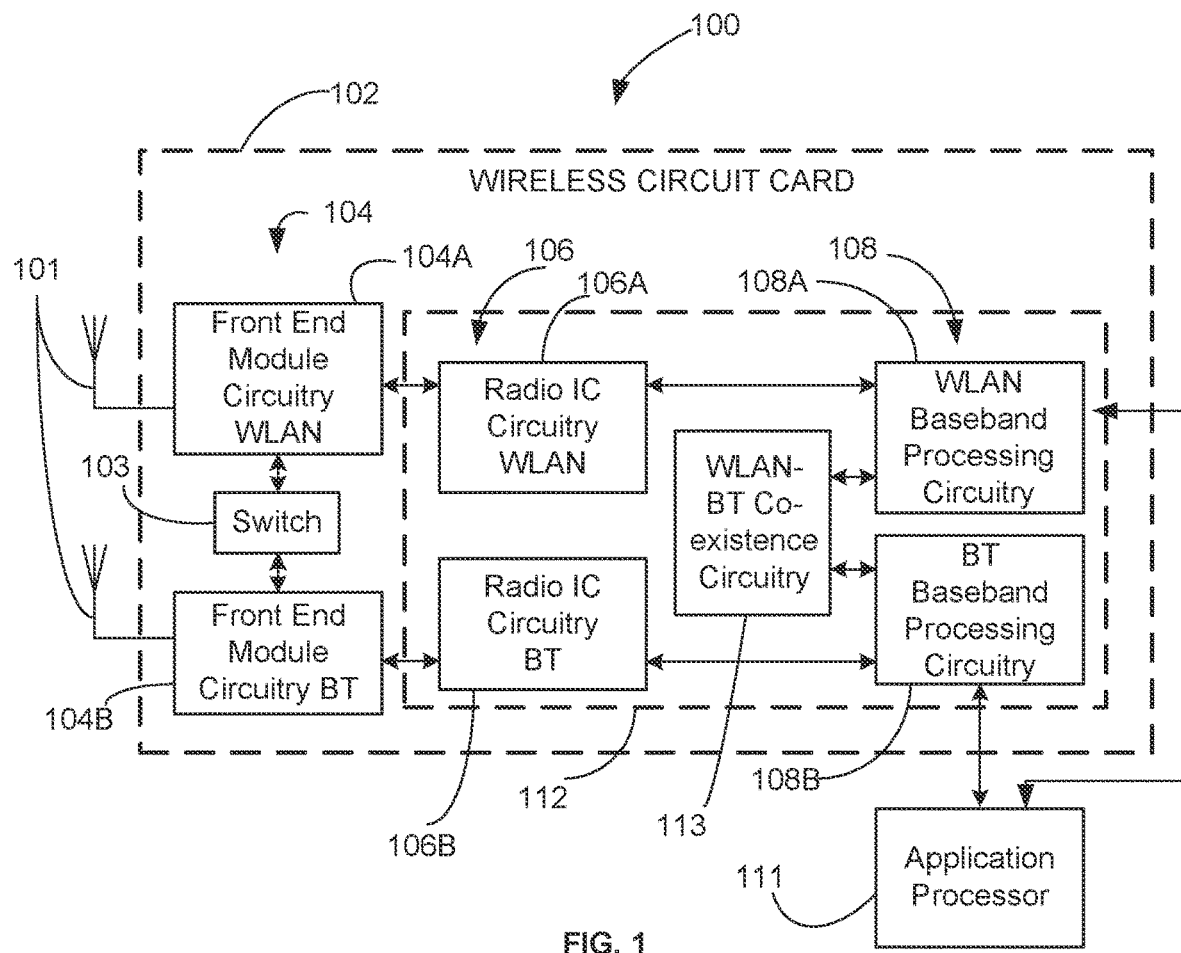
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
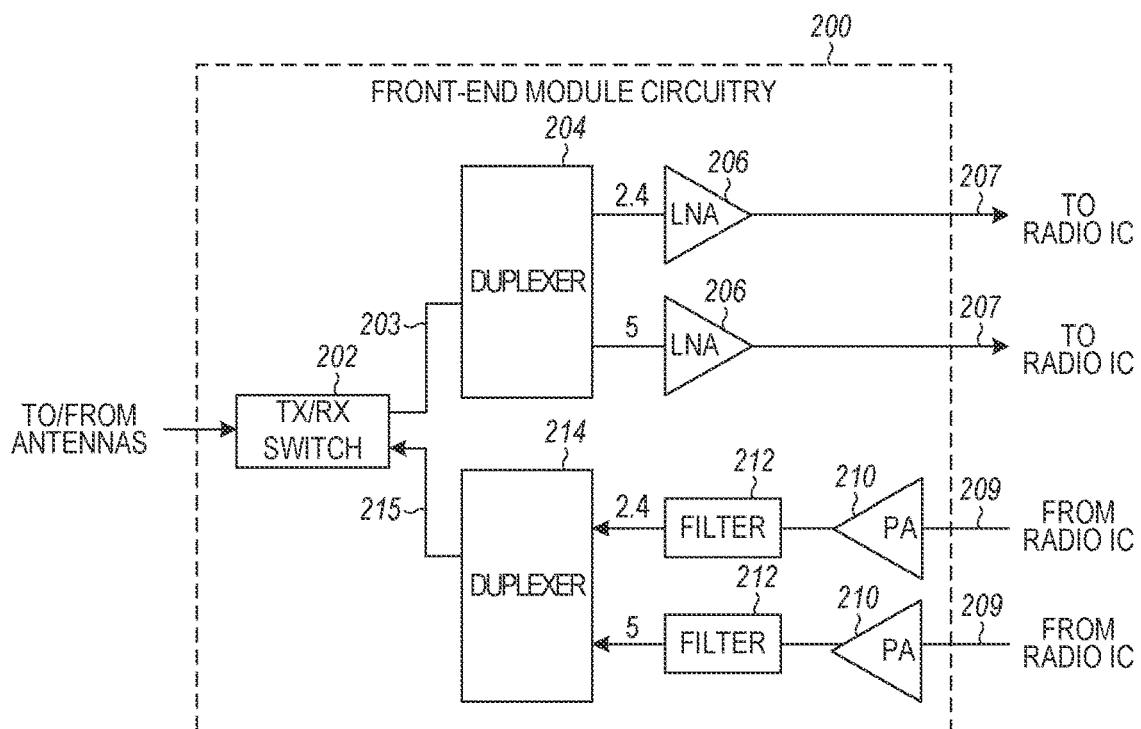
FIG. 2 illustrates FEM circuitry in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
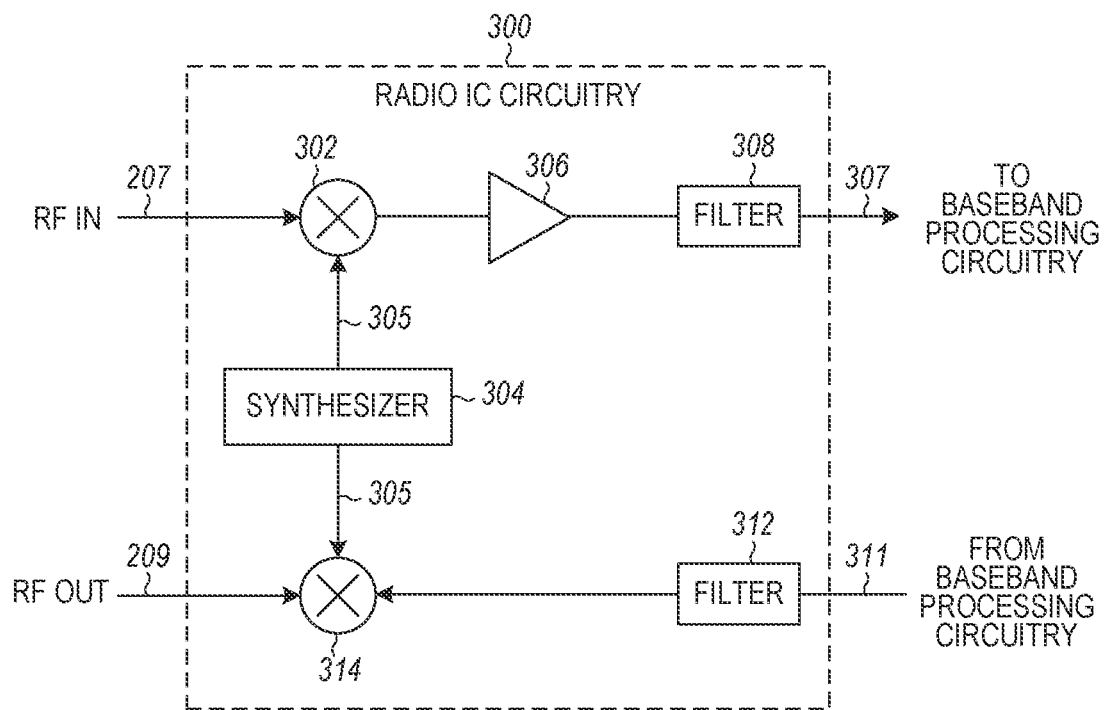
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
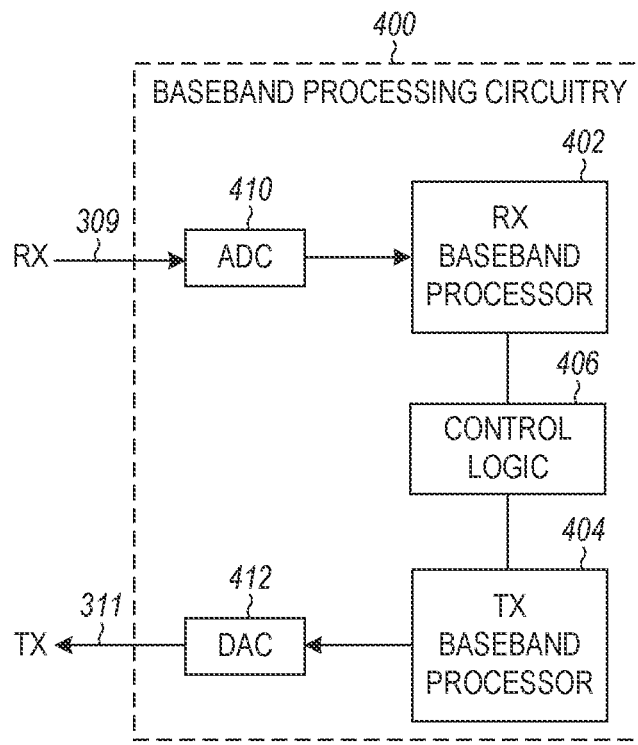
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
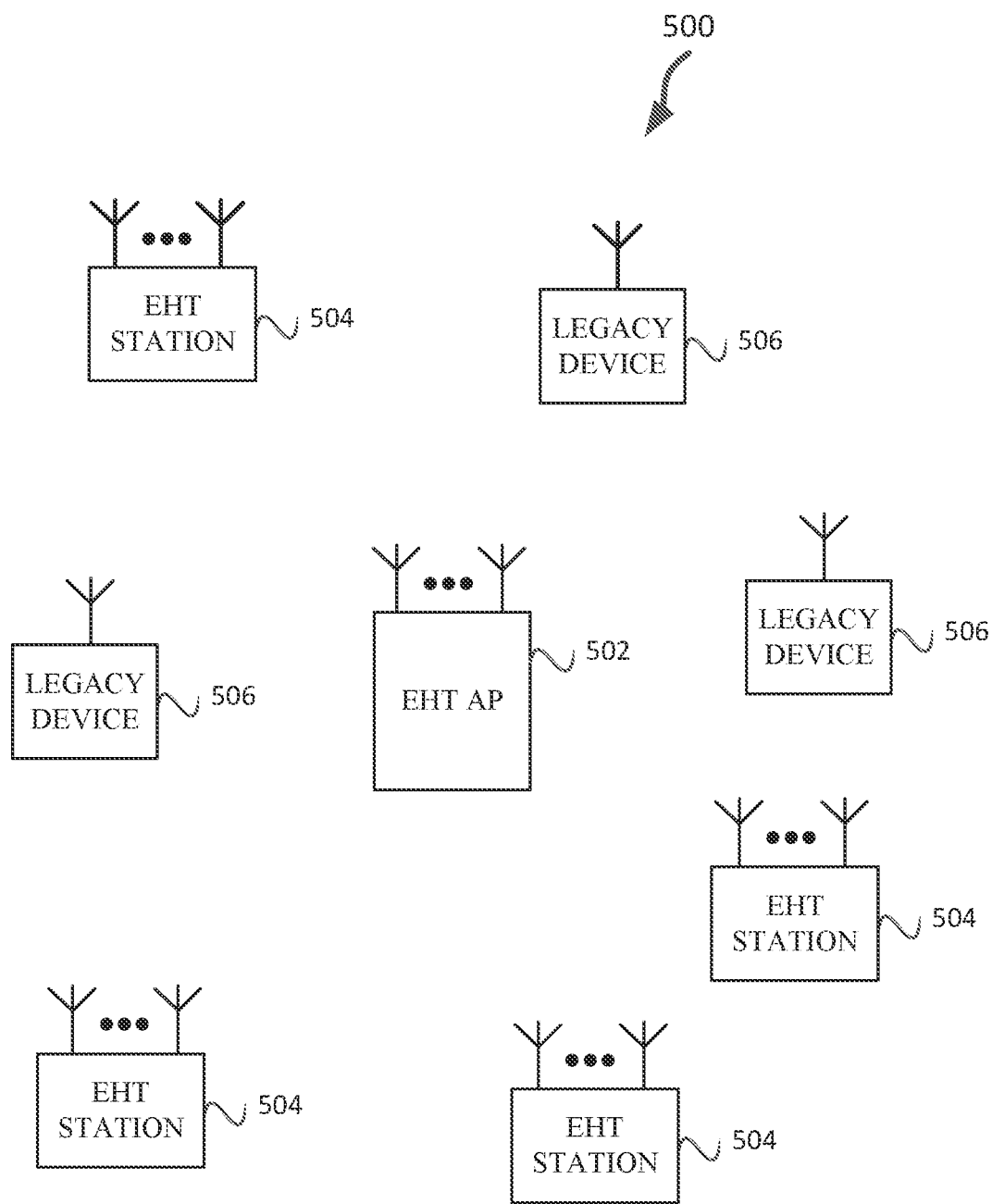
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of EHT (e.g., IEEE 802.11ax/be) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or HE AP 520 are configured to operate in accordance with IEEE 802.11az. In some embodiments, IEEE 802.11 EHT may be termed Next Generation 802.11. In some embodiments, the EHT AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS, may used different BSSIDs.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. EHT AP 502 may be connected to the internet. The EHT AP 502 and/or EHT STA 504 may be configured for one or more of the following: 320 MHz bandwidth, 16 spatial streams, multi-band or multi-stream operation (e.g., as disclosed in conjunction with FIG. 8), and 4096 QAM.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.1 lax. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160

MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit an EHT/HE trigger frame transmission, which may include a schedule for simultaneous UL transmissions from EHT STAs 504. The EHT AP 502 may transmit a time duration of the TXOP and sub-channel information. During the TXOP, EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the HE TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a HE station 502 or a EHT AP 502. In some embodiments, the EHT STA 504 and/or EHT AP 502 may be configured to operate in accordance with IEEE 802.11mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-31.

In example embodiments, the EHT station 504 and/or the EHT AP 502 are configured to perform the methods and operations/functions described herein in conjunction with FIGS. 1-31. In example embodiments, an apparatus of the EHT station 504 and/or an apparatus of the EHT AP 502 are configured to perform the methods and functions described herein in conjunction with FIGS. 1-31. The term Wi-Fi may refer to one or more of the IEEE 802.11 communication standards. AP and STA may refer to EHT/HE AP 502 and/or EHT/HE station 504 as well as legacy devices 506.

In some embodiments, a HE AP STA may refer to a EHT AP 502 and/or a EHT STAs 504 that is operating as a HE APs 502. In some embodiments, when a EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next generation IEEE 802.11 communication protocol, which may be IEEE 802.11be or may be designated another name.

Figure 6:
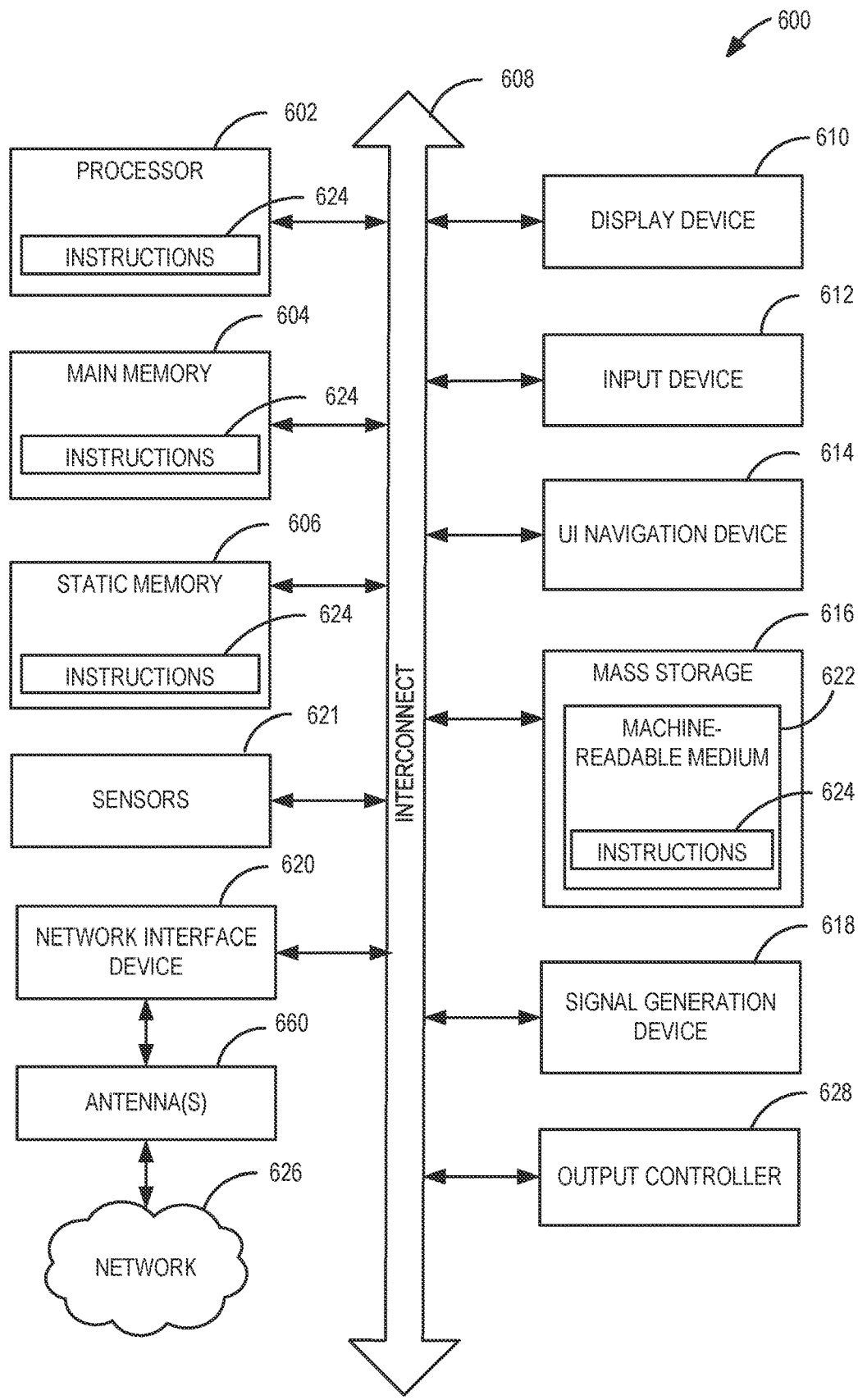
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
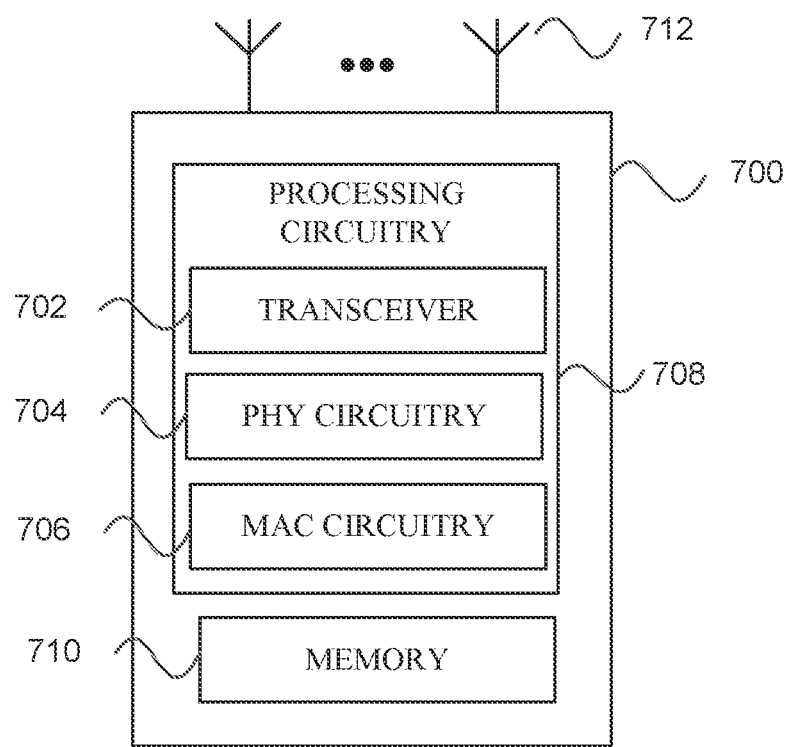
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
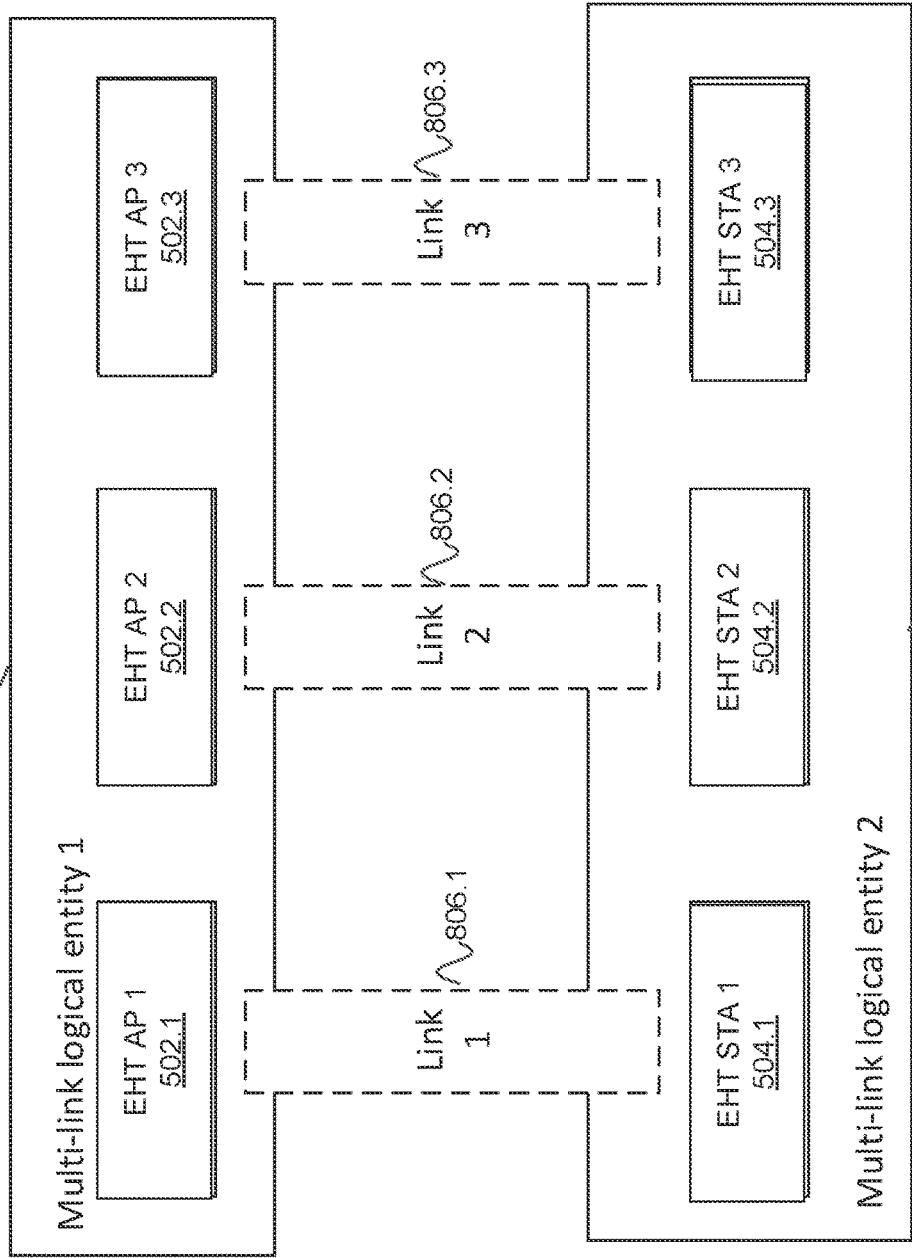
FIG. 8 illustrates a multi-link system, in accordance with some embodiments.

FIG. 8 illustrates a multi-link system 800, in accordance with some embodiments. Illustrated in FIG. 8 is multi-link logical entity 1 802, multi-link logical entity 2 804, link 1 806.1, link 2 806.2, link 3 806.3, EHT AP 1 502.1, EHT AP 2 502.2, EHT AP 3 502.3, EHT STA 1504.1, EHT STA 2 504.2, and EHT STA 3 504.3. The multi-link logical entity 804 may be an EHT STA 504 configured for multi-link operation. The multi-link logical entity 802 may be an EHT AP 502 configured for multi-link operation. The EHT APs 502 may be co-located APs. The links 806 may be different bands, e.g., 2.4, 5, 6, etc. The multi-link logical entity 802 may be configured to transmit MPDUs from a single MAC layer across the different links 806. The multi-link logical entity 2 804 may dynamically switch the number of links 806. In some embodiments there may be more two or more than three links 806. In some embodiments, multi-link logical entity 2 804 and multi-link logical entity 1 802 may make a BA agreement that is used for more than one link 806.

APs and/or STAs that are configured to operate in accordance with IEEE 802.11ax may operate with bandwidth of 160 MHz, 8 spatial stream, and 1024 QAM, and have a peak data rate of 9.6 Gbps. The EHT AP 502 and/or EHT STA 504 may be configured for one or more of the following: 320 MHz bandwidth, 16 spatial streams, multi-band or multi-stream operation (e.g., as disclosed in conjunction with FIG. 8), and 4096 QAM. In some embodiments the EHT STAs 504 may be EHT APs 502 so that two EHT APs 502 may be configured to exchange MPDUs 1004 using multiple links 806.

Figure 9:
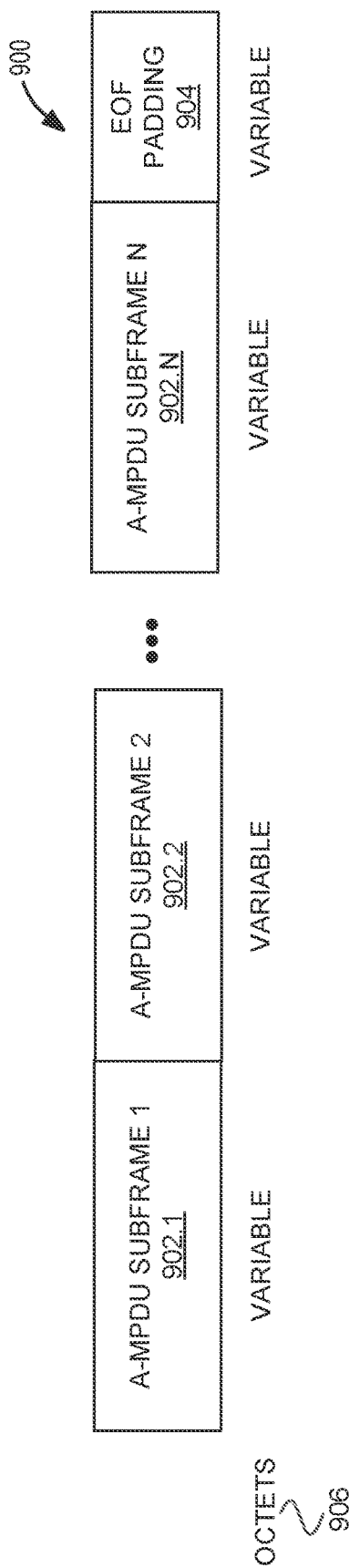
FIG. 9 illustrates an aggregated MPDU (A-MPDU), in accordance with some embodiments.

FIG. 9 illustrates an aggregated MPDU (A-MPDU) 900, in accordance with some embodiments. Illustrated in FIG. 9 is a A-MPDU subframe 1 902.1, A-MPDU subframe 2 902.2, A-MPDU subframe N 902.N, EOF padding 904, and octets 906. The A-MPDUs subframes 902 may be the same or similar as A-MPDU subframe 1000. The EOF padding 904 may be padding at the end of the A-MPDU 900. Octets 906 may indicate the number of octets of the A-MPDU subframes 902 and padding 904. In some embodiments, the MPDU 1004 may include a traffic identifier (TID) in a QoS control field. The A-MPDU subframes 902 may include MPDUs 1004 with different TIDs.

Figure 10:
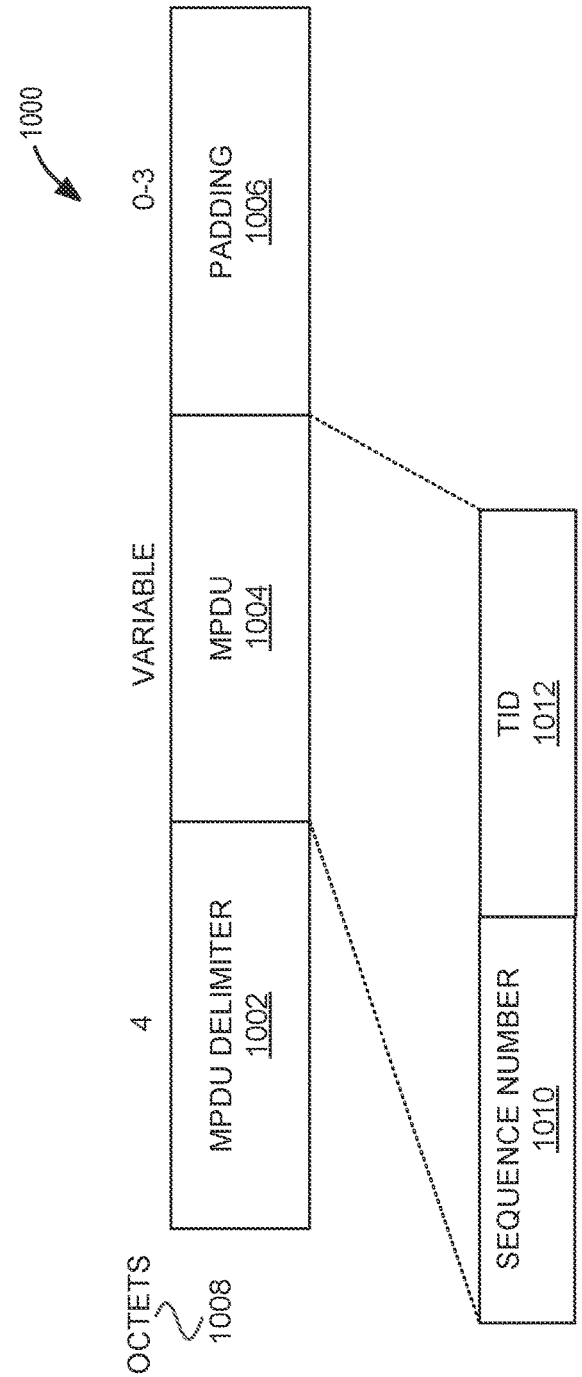
FIG. 10 illustrates an A-MPDU subframe, in accordance with some embodiments.

FIG. 10 illustrates an A-MPDU subframe 1000, in accordance with some embodiments. Illustrated in FIG. 10 is MPDU delimiter 1002, MPDU 1004, padding 1006, and octets 1008. MPDU delimiter 1002 may be the same or similar as MPDU delimiter 1100. MPDU 1004 may be a MPDU as disclosed herein and in conjunction with the communication standard, e.g., EHT or IEEE 802.11be. The padding 1006 may be padding bits. The MPDU 1004 may include a sequence number field 1010 and TID field 1012. The sequence number field 1010 may indicate a value indicate a sequence number of the MPDU 1004. The TID 1012 may indicate a TID for the MPDU 1004, which indicates one a fixed number of priorities for traffic.

Figure 11:
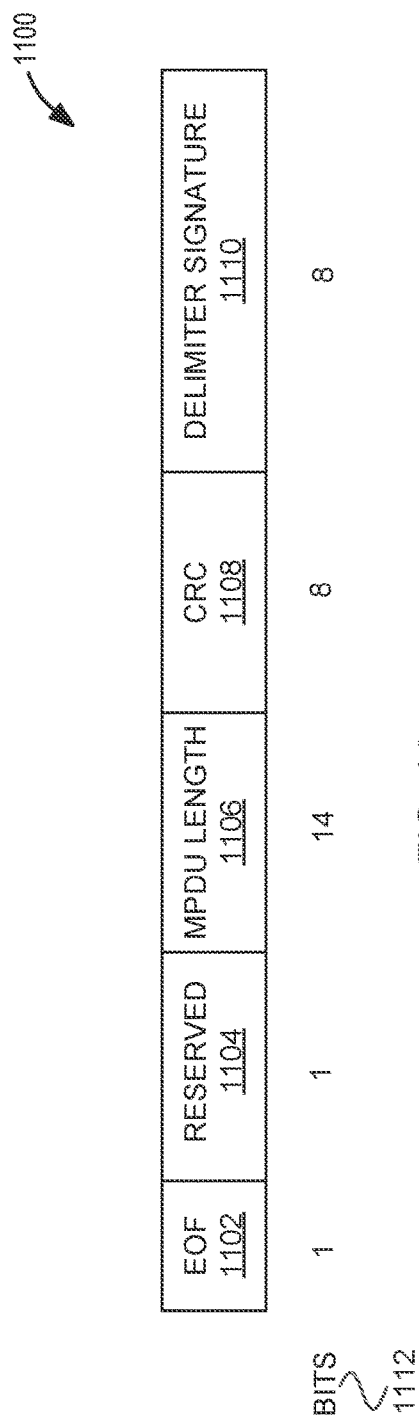
FIG. 11 illustrates a MPDU delimiter, in accordance with some embodiments.

FIG. 11 illustrates a MPDU delimiter 1100, in accordance with some embodiments. Illustrated in FIG. 11 is end of frame (EOF) 1102, reserved 1104, MPDU length 1106, CRC 1108, and delimiter signature 1110. MPDU length 1106 may be the length of the MPDU in octets. MPDU length 1106 may be the same or similar as MPDU length 1200 as disclosed in conjunction with FIG. 12.

CRC 1108 is an 8-bit CRC of the preceding 16 bits, in accordance with some embodiments. Delimiter signature 1110 may be a pattern used to detect an MPDU delimiter when scanning for an MPDU delimiter. In some embodiments delimiter signature 1110 is the pattern 0x4E. Reserved 1104 may be a reserved field. In some embodiments, MPDU length field 1106 may be set to indicate a length of the MPDU in octets. In some embodiments EOF 1102 may be set to indicate an end of a frame. In some embodiments, one or more of the fields illustrated in FIG. 11 may be set as described in the IEEE 802.11ax communication standard and as disclosed herein.

Figure 12:
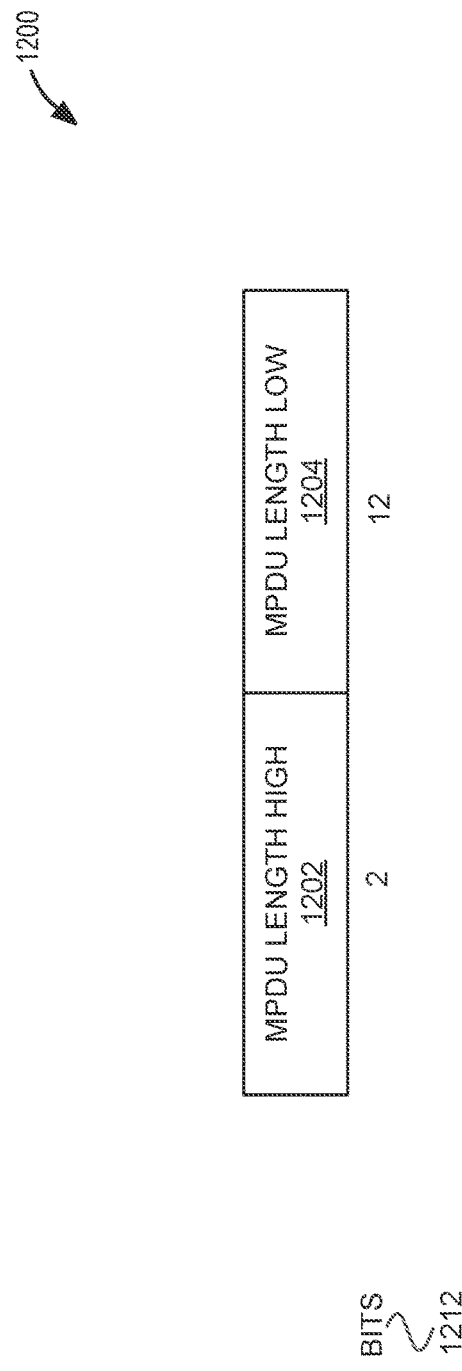
FIG. 12 illustrates a MPDU length, in accordance with some embodiments.

FIG. 12 illustrates a MPDU length 1200, in accordance with some embodiments. Illustrated in FIG. 12 is MPDU length high 1202 and MPDU length low 1204. The MPDU length high field 1202 and MPDU length low field 1204 may be set as described in the IEEE 802.1 lax communication standard and as disclosed herein. A legacy MPDU size may be 16383 bytes, but the maximum MPDU size is only 11454 bytes.

Figure 13:
FIG. 13 illustrates a capabilities element, in accordance with some embodiments.

FIG. 13 illustrates a capabilities element 1300, in accordance with some embodiments. Illustrated in FIG. 13 is maximum AMPDU length exponent extension field 1302 and additional fields 1304. Additional fields 1304 may be other fields included in the capabilities element 1300. The size limit of an A-MPDU is indicated (or indicated in conjunction with other fields) by the Maximum A-MPDU Length Exponent field 1302. In some embodiments, the capabilities element 1300 may be a HT capabilities element 1300, a HE capabilities element 1300, or a VHT capabilities element 1300.

Figure 14:
FIG. 14 illustrates an EHT capabilities element, in accordance with some embodiments.

FIG. 14 illustrates an EHT capabilities element 1400, in accordance with some embodiments. Illustrated in FIG. 14 is maximum AMPDU length exponent extension field 1402, BA bitmap field 1403, MPDU large length support field 1405, CRC polynomial field 1407, additional fields 1404, and FCS size field 1409. Additional fields 1404 may be other fields included in the EHT capabilities element 1400. In some embodiments maximum A-MPDU length exponent extension field 1402 may be termed a maximum A-MPDU length exponent field 1402. In some embodiments, BA bitmap field 1403 indicates support for a larger block ack bitmap 1704, 2006. In some embodiments, BA bitmap field 1403 indicates a size of the block ack bitmap 1704, 2006. In some embodiments, EHT capabilities element 1400 does not include one or more of maximum A-MPDU length exponent extension field 1402, BA bitmap field 1403, MPDU large length support 1405, CRC polynomial field 1407, and FCS size field 1409. MPDU large length support field 1405 may indicate support for a EHT large length MPDU as disclosed herein. CRC polynomial field 1407 may indicate support for the CRC polynomial as disclosed herein.

Figure 15:
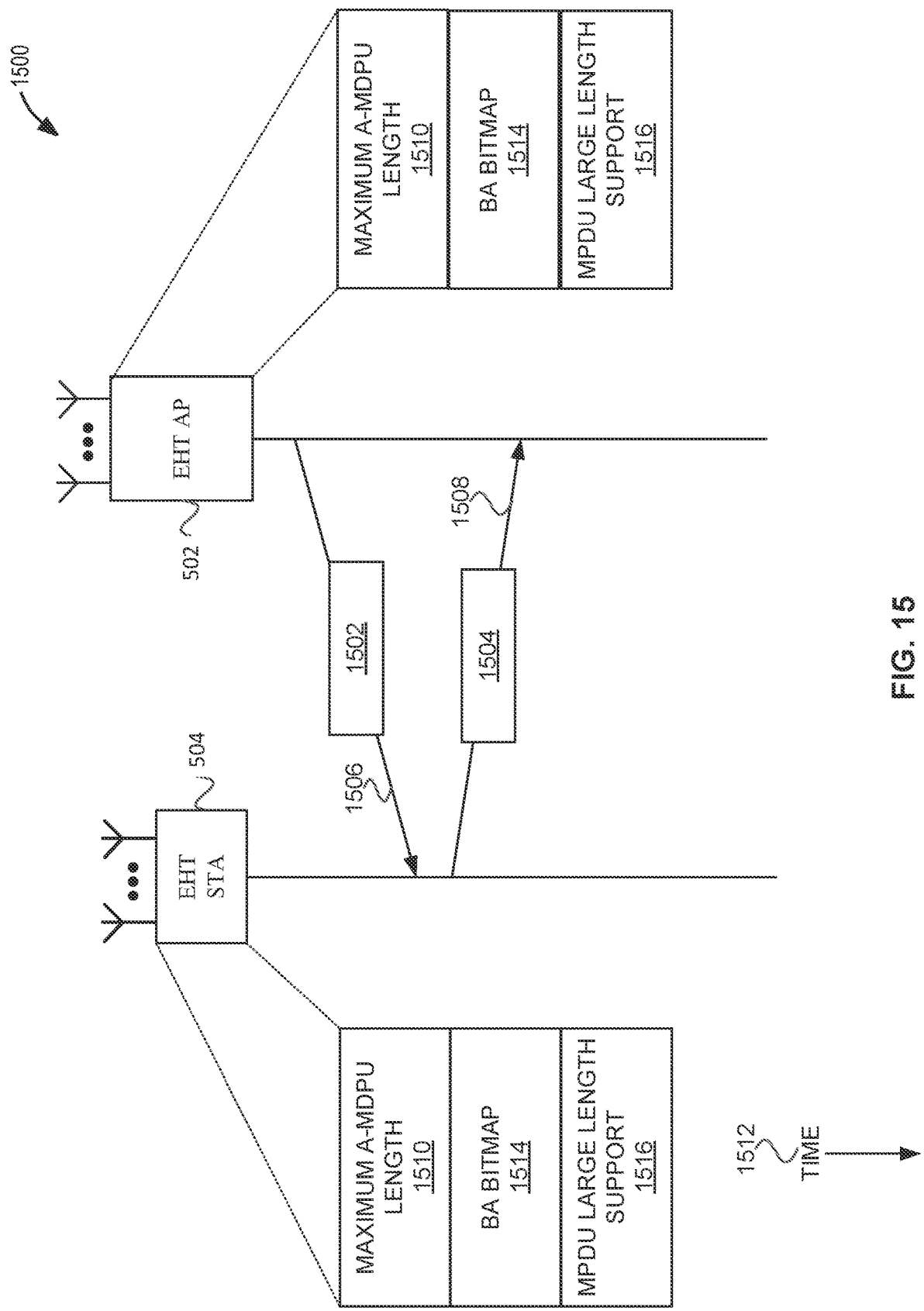
FIG. 15 illustrates an EHT STA and EHT AP determining configuration information, in accordance with some embodiments.

FIG. 15 illustrates an EHT STA and EHT AP determining configuration information 1500, in accordance with some embodiments. Illustrated in FIG. 15 is EHT STA 504, EHT AP 502, packet 1502, packet 1504, maximum A-MPDU length 1510, time 1512, BA bitmap field 1514, MPDU large length support field 1516. The EHT STA 504 and EHT AP 502 may exchange one or more packets 1502, 1504 that include configuration information. For example, packets 1502, 1504 may include EHT capabilities element 1400 and/or a HE capabilities element 1300. The EHT STA 504 and/or EHT AP 502 may determine one or more configuration parameters that may be based on the exchange 1506, 1508 of the one or more packets 1502, 1504. BA bitmap field 1514 may indicate a size of a bitmap for BA. EHT capabilities element 1400 may include one or more of maximum A-MPDU length field 1510, BA bitmap field 1514, and MPDU large length support 1516. MPDU large length support field 1516 may indicate whether the EHT STA 504 and/or EHT AP 502 support the larger MPDU size.

The size limit of an A-MPDU 1510 may be indicated by the Maximum A-MPDU Length Exponent field in EHT capabilities element 1402. In some embodiments, the EHT AP 502 and EHT STA 504 are configured to determine a maximum A-MPDU length based on one or more of the following.

In some embodiments, the number of bits of the maximum A-MPDU length exponent extension field 1402 is 2 bits for an increased range of the maximum A-MPDU length from $2^1$ to $2^3$ times, e.g., the maximum A-MPDU length exponent extension field 1402 may be multiplied by a current maximum A-MPDU length 1510 determination. In some embodiments, the number of bits of the maximum A-MPDU length exponent extension field 1402 is 3 bits for an increased range of the maximum A-MPDU length 1510 from $2^1$ to $2^7$ times. In some embodiments, the number of bits of the maximum A-MPDU length exponent extension field 1402 is 4 bits for an increased range of the maximum A-MPDU length 1510 from $2^1$ to $2^{15}$ times.

In some embodiments, EHT STA 504 and/or EHT AP 502 may determine the maximum A-MPDU length 1510 as $2^{(13+\text{Maximum A-MPDU Length Exponent subfield in the HT Capabilities element (if present)+Maximum A-MPDU Length Exponent subfield in the VHT Capabilities element (if present)+Maximum A-MPDU Length Exponent subfield 1302 in the HE Capabilities element 1300 (if present)+ Maximum A-MPDU Length Exponent subfield 1402 in the EHT Capabilities element 1400)}-1$.

In some embodiments, EHT STA 504 and/or EHT AP 502 may determine the maximum A-MPDU length as $2^{(13+\text{Maximum A-MPDU Length Exponent subfield in the VHT Capabilities element (if present)+Maximum A-MPDU Length Exponent subfield in the HE Capabilities element 1302 (if present)+Maximum A-MPDU Length Exponent subfield 1402 in the EHT Capabilities element 1400)}-1$.

In some embodiments, EHT STA 504 and/or EHT AP 502 may determine the maximum A-MPDU length 1510 as $2^{(13+\text{Maximum A-MPDU Length Exponent subfield in the HT Capabilities element (if present)+Maximum A-MPDU Length Exponent subfield 1302 in the HE Capabilities element 1304 (if present)+Maximum A-MPDU Length Exponent subfield 1402 in the EHT Capabilities element 1400)}-1$.

In some embodiments, EHT STA 504 and/or EHT AP 502 may determine the maximum A-MPDU length 1510 as jointly determined by the Maximum A-MPDU Length Exponent field 1402 in the EHT capabilities element 1400, HE capabilities element 1300, and VHT capabilities element when VHT capabilities element is transmitted and the Maximum A-MPDU Length Exponent subfield in EHT Capabilities element is not 0. For example, in some embodiments, EHT STA 504 and/or EHT AP 502 may determine the maximum A-MPDU length 1510 as $2^{(23+\text{Maximum A-MPDU Length Exponent subfield (not illustrated, but an embodiment of the maximum A-MPDU length exponent extension field 1402) in the EHT Capabilities element 1400)}-1$. In some embodiments, the maximum A-MDP length 1510 is determined as $2^{23}+\text{Maximum A-MPDU Length Exponent subfield}$, when the value in the Maximum A-MPDU Length Exponent subfield in the VHT Capabilities element (if present) is 7 and the value in the Maximum A-MPDU Length Exponent subfield in the HE Capabilities element is 3.

In some embodiments, EHT STA 504 and/or EHT AP 502 may determine the maximum A-MPDU length 1510 based on the Maximum A-MPDU Length Exponent field 1402 in the EHT capabilities element 1400, HE capabilities element 1300, and HT capabilities element when the VHT capabilities element is not transmitted and the Maximum A-MPDU Length Exponent subfield 1402 in EHT Capabilities 1400 element is not 0. In some embodiments, EHT STA 504 and/or EHT AP 502 may determine the maximum A-MPDU length 1510 as $2^{(19+\text{Maximum A-MPDU Length Exponent subfield 1402 in the EHT Capabilities element 1400)}-1}$, if the value in the Maximum A-MPDU Length Exponent subfield in the HT Capabilities element is 3 and the value in the Maximum A-MPDU Length Exponent subfield 1302 in the HE Capabilities element 1300 is 3

Figure 16:
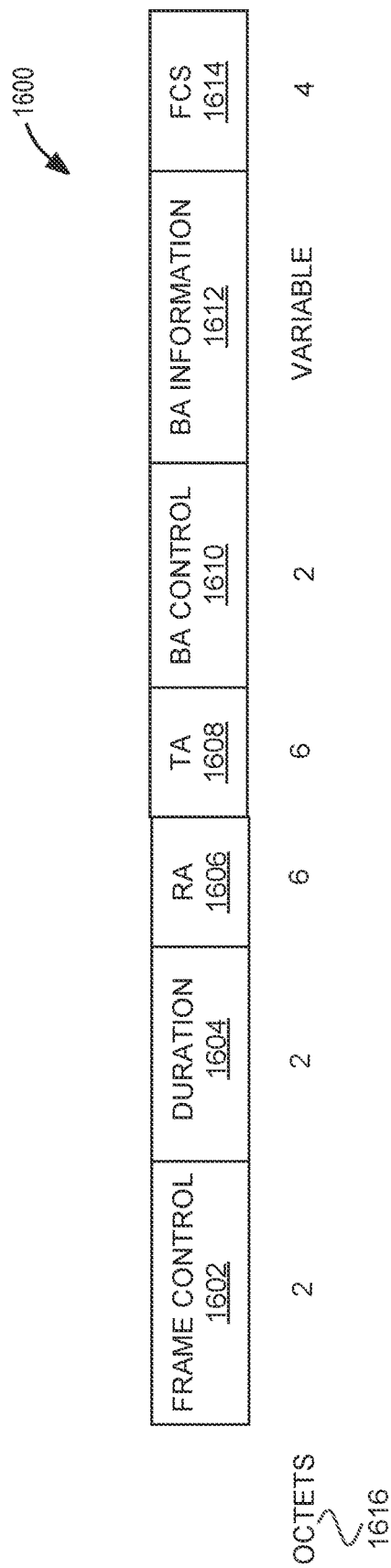
FIG. 16 illustrates a block acknowledgement (BA) frame, in accordance with some embodiments.

FIG. 16 illustrates a block acknowledgement (BA) frame 1600, in accordance with some embodiments. Illustrated in FIG. 16 is frame control field 1602, duration field 1604, receiver address (RA) field 1606, transmitter address (TA) field 1608, BA control field 1610, BA information field 1612, frame check sequence (FCS) field 1614, and octets 1616.

The duration field 1604 may be set to a duration of BA frame 1600. The RA field 1606 may be an address of the recipient STA, e.g., EHT AP 502 or EHT STA 504, that requested the BA. The TA field 1608 may be the address of the STA, e.g., EHT AP 502 or EHT STA 504, transmitting the BA frame 1600. The frame control field 1602 may indicate that the frame is a BA frame. The FCS field 1614 may include check sum information for the BA frame 1600. The BA information field 1612 may be the same or similar as BA information field 1700 or BA information field 1900. The BA control field 1610 may indicate a BA ack policy, multi-TID, compressed bitmap, GCR, and/or TID information, in accordance with some embodiments. Octets 1616 indicates a number of octets for the fields.

Figure 17:
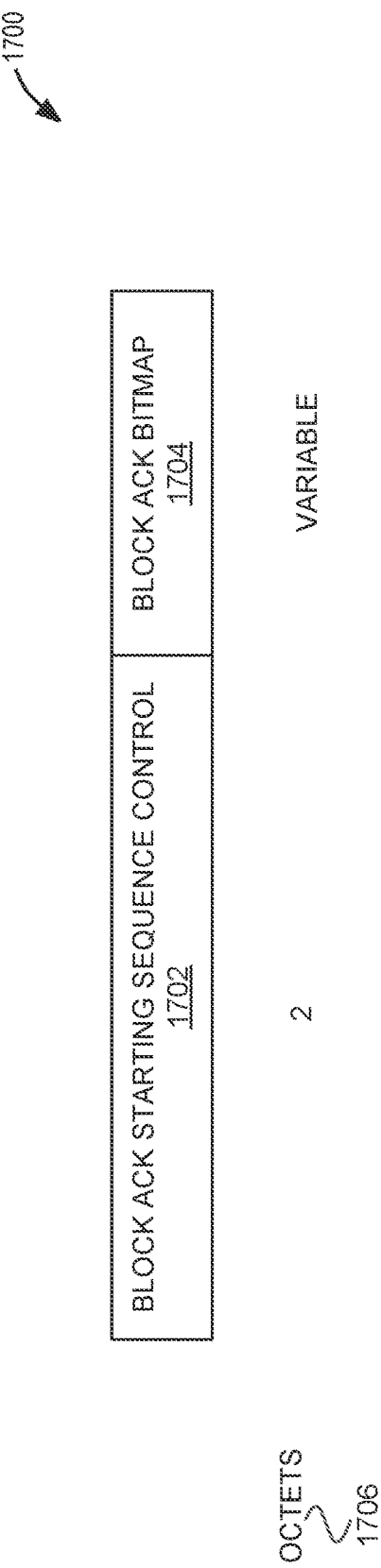
FIG. 17 illustrates a BA information field, in accordance with some embodiments.

FIG. 17 illustrates a BA information field 1700, in accordance with some embodiments. Illustrated in FIG. 17 is block ack starting sequence control field 1702, block ack bitmap field 1704, and octets 1706. Octets 1706 indicates a number of octets for the fields. Block ack starting sequence control field 1702 may be the same or similar as block ack starting sequence control field 1800. Block ack bitmap field 1704 may be a bitmap field for indicating acknowledgement of MPDUs. The BA information 1700 may be for a compressed blockack.

Figure 18:
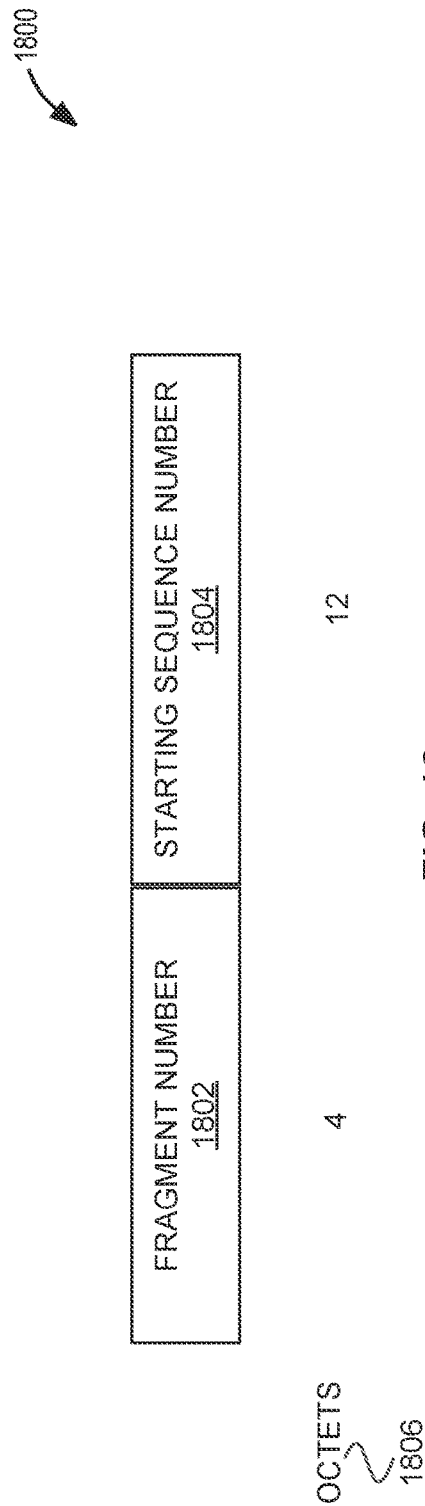
FIG. 18 illustrates a block acknowledgement (ack) starting sequence control field, in accordance with some embodiments.

FIG. 18 illustrates a block acknowledgement (ack) starting sequence control field 1800, in accordance with some embodiments. Illustrated in FIG. 18 is frame number field 1802, starting sequence number 1804, and octets 1806. Octets 1806 may indicate a number of octets of the fields. Fragment number field 1802 may indicate a fragmentation level, a length of the block ack bitmap field 1704, and/or a maximum number of MSDUs/A-MSDU that can be acknowledged. Starting sequence number field 1802 may indicate a starting sequence number of a MPDU, which includes a sequence number, e.g., a sequence number that indicates a value of a sequence number field 1010.

Figure 19:
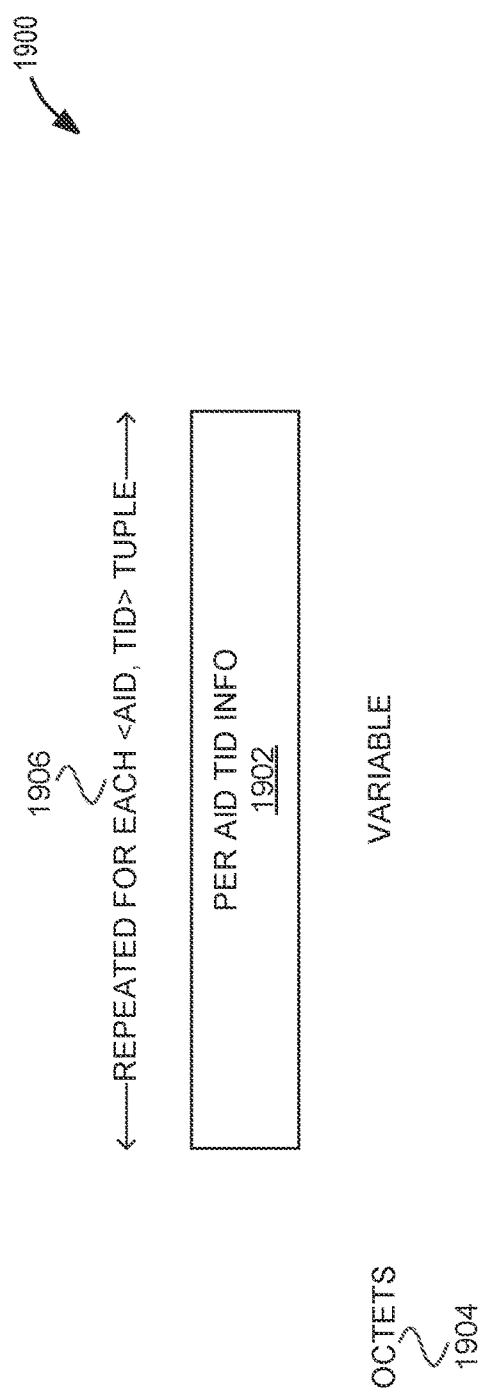
FIG. 19 illustrates a BA information field format, in accordance with some embodiments.

FIG. 19 illustrates a BA information field format 1900, in accordance with some embodiments. Illustrated in FIG. 19 is per association identification (AID) TID information (INFO) field 1902, octets 1904, and repeated for each <AID, TID> tuple 1906. Octets 1904 may indicate a number of octets of the per AID TID info 1902. The per AID TID info 1902 may be repeated for each <AID, TID> tuple 1906. The TID may indicate the TID, e.g., TID 1012. The AID may refer to an address of an EHT STA 504 or EHT AP 502. The per association AID TID info field 1902 may be the same or similar as per AID TID info field 2000.

Figure 20:
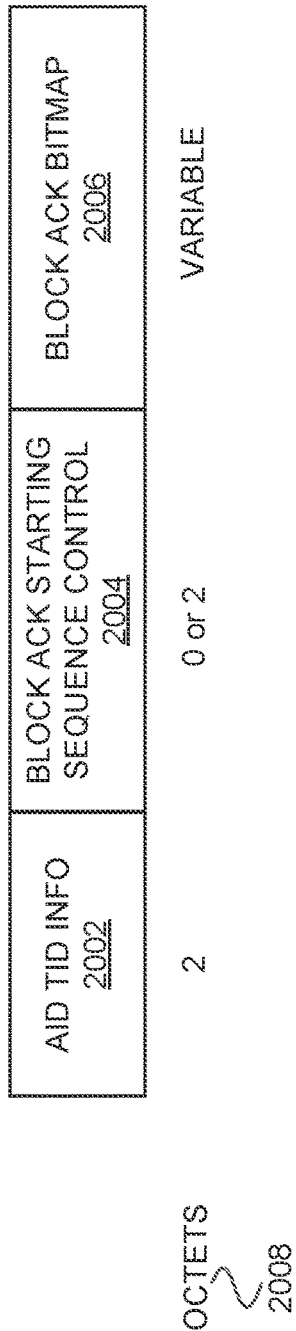
FIG. 20 illustrates a per association identification (AID) traffic identification (TID) field, in accordance with some embodiments.

FIG. 20 illustrates a per association identification (AID) traffic identification (TID) field 2000, in accordance with some embodiments. Illustrated in FIG. 20 is AID TID info field 2002, block ack starting sequence control field 2004, block ack bitmap field 2006, and octets 2008. Octets 2008 may indicate a number of octets for the fields. The AID TID info field 2002 may be the same or similar as AID TID info field 2100. The block ack starting sequence control field 2004 may indicate a starting block ack starting sequence control as disclosed in conjunction with IEEE 802.1 lax, e.g., a sequence number 1010. The block ack bitmap filed 2006 may be a bitmap indicating which MPDUs are being acknowledged. In some embodiments the per AID TID field 2000 indicates a format if the AID11 field 2102 does not equal 2045.

Figure 21:
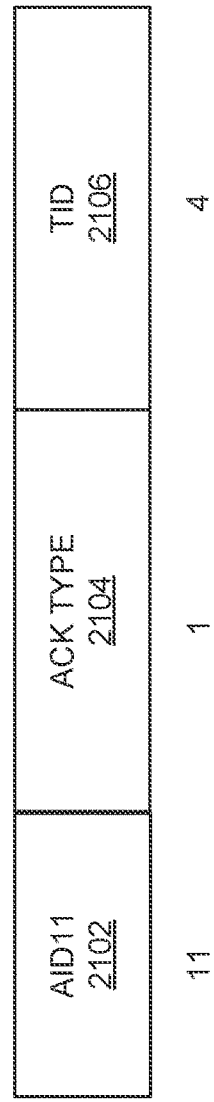
FIG. 21 illustrates an AID TID information (info) field, in accordance with some embodiments.

FIG. 21 illustrates an AID TID information (info) field 2100, in accordance with some embodiments. Illustrated in FIG. 21 is AID11 2102, ack type 2104, TID field 2106, and bits 2108. The AID11 field 2102 may indicate 11 bits of an AID of a STA (e.g., EHT STA 504 or EHT AP 502). The ack type field 2104 may indicate a type of ack. The TID field 2106 may indicate a TID for the BAs, e.g., TID 1012. Fragment number field 1802 may indicate a fragmentation level, a length of the block ack bitmap field 2006, and/or a maximum number of MSDUs/A-MSDU that can be acknowledged.

In some embodiments, block ack bitmap 1704, 2006 is greater than 256 bits. In some embodiments, the block ack bitmap 1704, 2006 is 64*n for any n=5 to 32 bits. In some embodiments, the range of sequence numbers 1010 that are possible is 4096 so that a maximum of 2048 bits is the maximum size of block ack bitmap 2006 that could be used. In some embodiments, BA bitmap field 1403, 1514 indicates support for a larger block ack bitmap 1704, 2006 than a legacy size, e.g., greater than 256 bits.

In some embodiments, fragment number 1802 for compressed block ack variant may indicate block ack bitmap field 1704, 2006 size. For example, reserved entry in fragment number subfield 1802 encoding for the compressed BlockAck variant is used for the new BA bitmap indication. For example, different BA bitmap lengths are indicated by B0 is 0, and one entry for B0 is 1. In some embodiments, different BA bitmap lengths are indicated with B3 is 1 and B2, B1, and B0 have different values, e.g., B3=1 and B0=0 indicates 64*n for one of n=5 to 32 bits.

In some embodiments, fragment number 1802 for multi-STA block ack variant may indicate block ack bitmap field 1704, 2006 size. For example, reserved entry in fragment number subfield 1802 encoding for the compressed BlockAck variant is used for the new BA bitmap indication. For example, different BA bitmap lengths are indicated by B0 is 0, and one entry for B0 is 1. In some embodiments, different BA bitmap lengths are indicated with B3 is 1 and B2, B1, and B0 have different values, e.g., B3=1 and B0=0 indicates 64*n for one of n=5 to 32 bits.

In some embodiments the BA control field 1610 indicates a BlockAck variant that indicates a new larger BA bitmap size. For example, a field of BA control field 1610 may indicates values of a blockack frame variant encoding. One value of the BA control field 1610 can indicate block ack EHT compressed BlockAck with indication for larger BA bitmap size. One value of the BA control field 1610 can indicate EHT Multi-STA BlockAck with indication for larger BA bitmap size. One value of the BA control field 1610 can indicate EHT Multi-TID BlockAck with indication for larger BA bitmap size. One value of the BA control field 1610 can indicate EHT GCR BlockAck with indication for larger BA bitmap size. In some embodiments, the bits used may be BA type B1, B2, B3, and/or B4, which are used to indicate the BlockAck frame variants of EHT compressed BlockAck with indication for larger BA bitmap size; EHT Multi-STA BlockAck with indication for larger BA bitmap size; EHT Multi-TID BlockAck with indication for larger BA bitmap size; and, EHT GCR BlockAck with indication for larger BA bitmap size.

Figure 22:
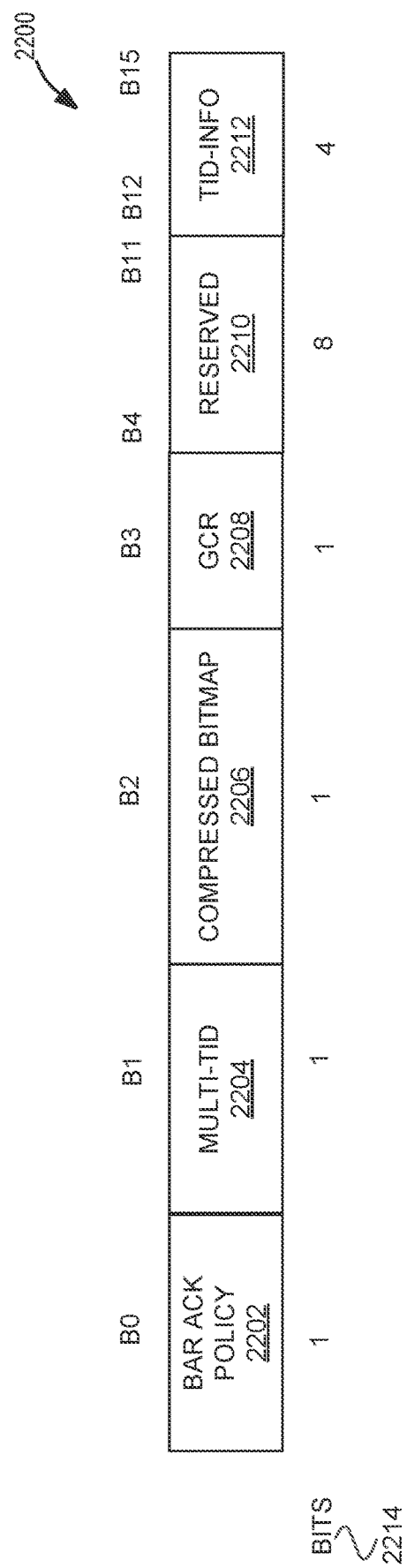
FIG. 22 illustrates a block acknowledgement request (BAR) field, in accordance with some embodiments.

FIG. 22 illustrates a block acknowledgement request (BAR) field 2200, in accordance with some embodiments. Illustrated in FIG. 22 is BAR ack policy field 2202, multi-TID field 2204, compressed bitmap field 2206, group cast with retries (GCR) field 2208, reserved field 2210, TID information (info) field 2212, and bits 2214. Bits 2214 indicates the bit (B0 through B15) and the number of bits for the fields. Referring to FIG. 15, the EHT STA 504 and/or EHT AP 502 may determine one or more configuration parameters for block ack based on the exchange 1506, 1508 of the one or more packets 1502, 1504, where the BAR field 2200 may be included in one of the packets 1502, 1504.

The BAR field 220 may be used to solicit block ack with a larger BA bitmap size, e.g., larger than 256 bits. In some embodiments, B1-B3 can be used to indicate a block ack request where B1, B2, and B3 indicate one of the following: soliciting EHT compressed block ack, soliciting EHT multi-TID block ack, and soliciting EHT GCR block ack. In some embodiments, B1-B4 may be jointed used to indicate a new block ack request where B1, B2, B3, and B4 indicate one of the following: soliciting EHT compressed block ack, soliciting EHT multi-TID block ack, and soliciting EHT GCR block ack.

In some embodiments the MPDU size limit is more than 11454 bytes. In some embodiments, the size limit of the MPDU is 16383 or a value between 11454 and 16383. In some embodiments, the size limit of the MPDU may be 32767 or any value between 16383 and 32767. In some embodiments, a reserved bit (e.g., reserved 1104) in the MPDU delimiter 1100 is used to jointly indicate the MPDU length (e.g., MPDU length 1106) where the MPDU 1004 follows the MPDU delimiter 1002 (FIG. 10).

In some embodiments, one or more bits of the delimiter signature field 1110 are used to jointly indicate the MPDU length 1106 of the MPDU 1004. In some embodiments, the delimiter signature field 1110 bits can be used because it most of the MAC implementation does not use the bits of the signature field 1110. One or more bits of the delimiter signature field 1110 is used for transmitting to EHT STAs 504 that are capable to receive larger MPDU size and interpret the bits of the delimiter signature field 1110, in accordance with some embodiments. In some embodiments, one or more bits of the MPDU delimiter field 1002 (e.g., reserved 1104 or delimiter signature field 1110) are used when an EHT format PPDU is transmitted. In some embodiments, the indicated MPDU length 1106 is determined by the EHT STA 504 and EHT AP 502 as $L_{low}+L_{high} \times 4096 +$ Indicated_value_of_bit x 16384, where indicated value of bit x indicates one or more bits of the MPDU delimiter field 1002 that are not part of the MPDU length field 1106, $L_{low}$ indicates MPDU length low field 1204 and $L_{high}$ indicates MPDU length high field 1202.

In some embodiments, CRC polynomial for 32 bits FCS field calculation can be changed to accommodate the larger MPDU size. The CRC is used when an EHT format PPDU is transmitted. The CRC polynomial is used when MPDU length is larger than a predetermined threshold, e.g., the threshold can be 11454 bytes. The CRC polynomial is used when MPDU is in an A-MPDU, in accordance with some embodiments. The CRC polynomial may be CRC-32C. The CRC may be one bit in EHT capabilities element 1400 that is used to indicate the support of the CRC polynomial, e.g., CRC polynomial field 1407.

In some embodiments, the size of FCS field is increased beyond 32 bits with new CRC polynomial. The possible size can be 32+8*n, where n is an integer, to maintain byte alignment. The FCS size and computation polynomial can be used when EHT format PPDU is transmitted. The new CRC polynomial can be used when MPDU length is larger than a certain threshold, e.g., a threshold of 11454 bytes. The CRC polynomial is used when MPDU is in an A-MPDU 900, in accordance with some embodiments. In some embodiments, one bit in EHT capabilities element 1400 is used to indicate the support of the new CRC polynomial, e.g., CRC polynomial field 1407. One bit in EHT capabilities element 1400 is used to indicate the support of the FCS size that is greater than 32 bits, e.g., FCS size field 1409 may indicate support for the FCS size that is greater than 32 bits. In some embodiments, the MSDU size limit can be increased to close to the increased MPDU size and to lessen A-MSDU aggregation.

In some embodiments, the PPDU duration is extended beyond IEEE 802.11ax limit of 5.484 ms. The PPDU duration is used when an EHT PPDU (not illustrated) is transmitted with a new EHT-SIG indication. If the EHT STA 504 and EHT AP 502 use the duration field in the L-SIG for the duration, then the limit of 5.484 may be used. In some embodiments, the EHT PPDU duration is up to the TXOP limit, e.g., of 5.56 ms or more.

The following examples illustrate that the A-MPDU design disclosed herein matches the PHY data rate. The peak data rate of an EHT device (e.g., EHT STA 504 or EHT AP 502) can potentially be 46 Gbps. In some embodiments, the A-MPDU size limit is increased by 4 times to 32 MB ($2^{25}-1$ bytes) or 256 Mb. The corresponding EHT PPDU duration can then be 5.56 ms that is similar to the scale of 4 ms default TXOP limit and 5.4 ms PPDU duration limit, in accordance with some embodiments. In some embodiments, the size of the BA bitmap is increased 1024 (4×). In some embodiments, the maximum A-MPDU size for one TID is then 11.7 MB that is 36% of the A-MPDU size limit proposed above. In some embodiments, the MPDU size limit to 32767 (2.8×) and BA bitmap to 1024 (4×). In some embodiments, the maximum A-MPDU size for one TID is then more than 100% of the size limit proposed above. Embodiments have the advantage of being able to deliver MAC performance that is able to use the potential PHY data rate of 46 Gbps. Embodiments may provide a technical solution to how to utilize the PHY data rate of 46 Gbps with MPDUs and BAs.

Figure 23:
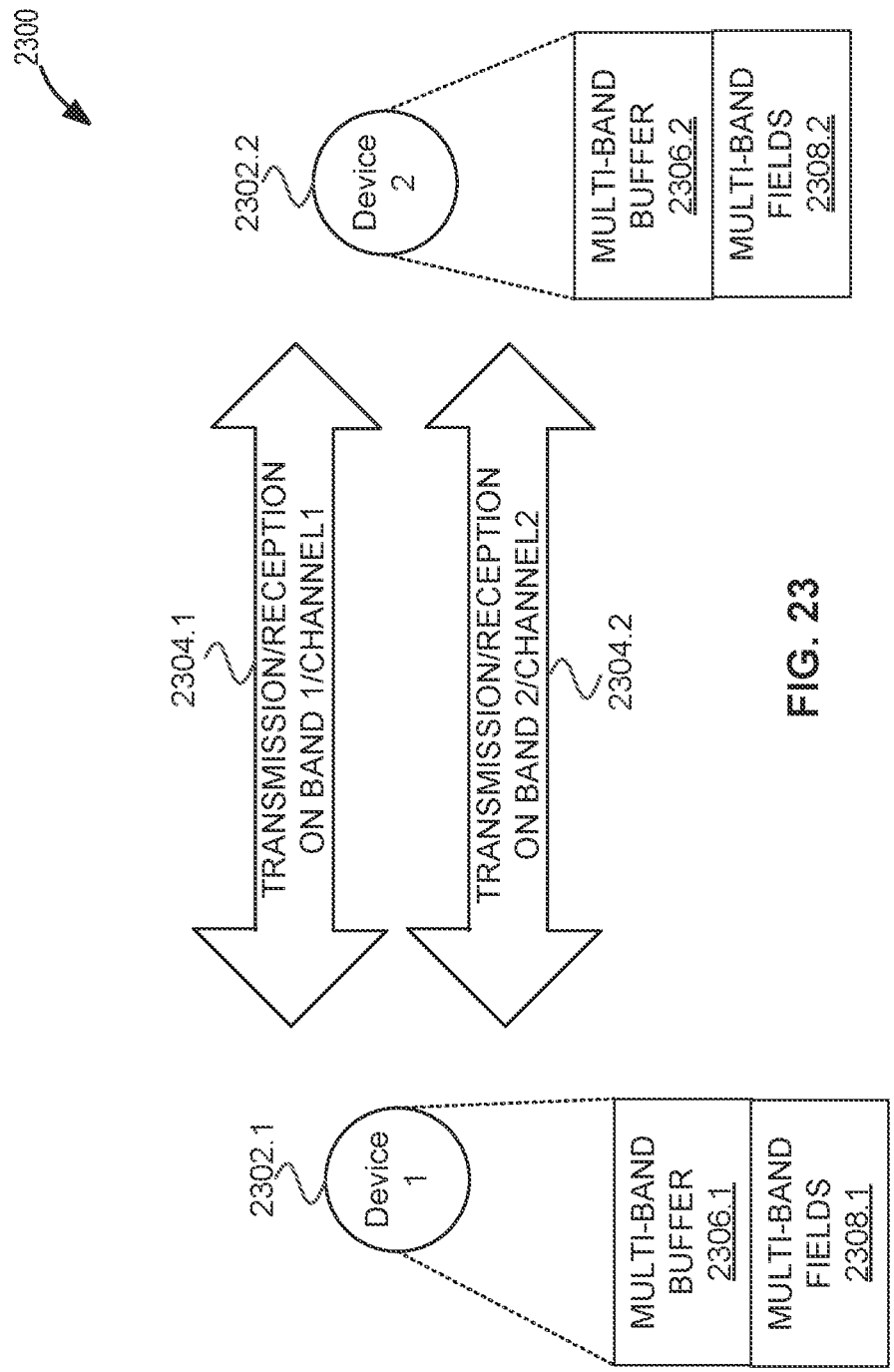
FIG. 23 illustrates a system for multi-link operation, in accordance with some embodiments.

FIG. 23 illustrates a system 2300 for multi-link operation, in accordance with some embodiments. Illustrated in FIG. 23 is device 1 2302.1, device 2 2302.2, link 1 2304.1, and link 2 2304.2. Device 1 2302.1 and device 2 2302.2 may be a EHT AP 502 or a EHT STA 504. Link 1 2304.1 may include transmissions/receptions on band 1/channel 1 and link 2 2304.2 may include transmissions/receptions on band 2/channel 2. The links 2304 may be connections on different channels of a same band or on different bands. There may be more than two links 2304. In some embodiments, buffer management is coordinated between the links 2304, e.g., a single BA policy may be agreed upon by device 1 2302.1 and device 2 2302.2 and used on both links 2304. In some embodiments, a transmit buffer and receive reordering buffer are shared between the links 2304. Device 2302 may include multi-band buffers 2306 and multi-band fields 2308. Multi-band fields 2308 may be fields that are transmitted across one or more of the links 2304 and may be stored on the devices 2302.

Figure 24:
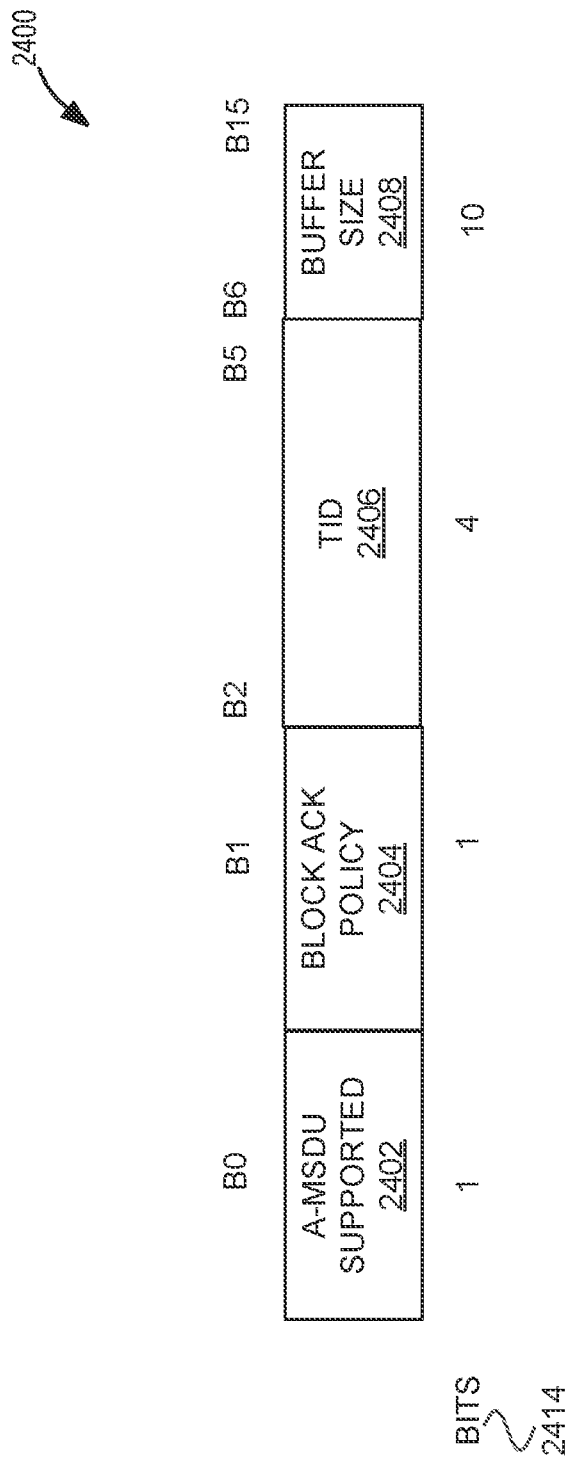
FIG. 24 illustrates a block ack parameter set fixed field, in accordance with some embodiments.

FIG. 24 illustrates a block ack parameter set fixed field 2400, in accordance with some embodiments. Illustrated in FIG. 24 is A-MSDU supported field 2402, block ack policy field 2404, TID field 2406, and buffer size field 2408. One or more of the fields of block ack parameter set fixed field 2400 may be optional. Block ack parameter set fixed field 2400 may include one or more additional fields.

FIG. 25 illustrates a multi-band element format 2500, in accordance with some embodiments. Illustrated in FIG. 25 is element ID field 2502, length field 2504, multi-band control field 2506, band ID field 2508, operating class field 2510, channel number field 2512, BSSID field 2514, beacon interval field 2516, TSF offset field 2518, multi-band connection capability field 2520, FST session timeout field 2522, STA MAC address field 2524, pairwise cipher suite count filed 2526, pairwise cipher suite list field 2528, and octets 2530. In some embodiments multi-band control field 2506 is the same or similar as multi-band control field 2600. One or more of the fields of multi-band element format 2500 may be optional. Multi-band element format 2500 may include one or more additional fields.

FIG. 26 illustrates a multi-band control field format 2600, in accordance with some embodiments. Illustrated in FIG. 26 is STA role field 2602, STA MAC address present field 2604, pairwise cipher suite present field 2606, reserved field 2608, and bits 2610. One or more of the fields of multi-band control field format 2600 may be optional. Multi-band control field format 2600 may include one or more additional fields.

FIG. 27 illustrates an add BA (ADDBA) extension element 2700, in accordance with some embodiments. Illustrated in FIG. 27 is element ID field 2702, length field 2704, ADDBA capabilities field 2706, extended filed 2708, and octets 2710. One or more of the fields of ADDBA extension element 2700 may be optional. ADDBA extension element 2700 may include one or more additional fields.

Figure 28:
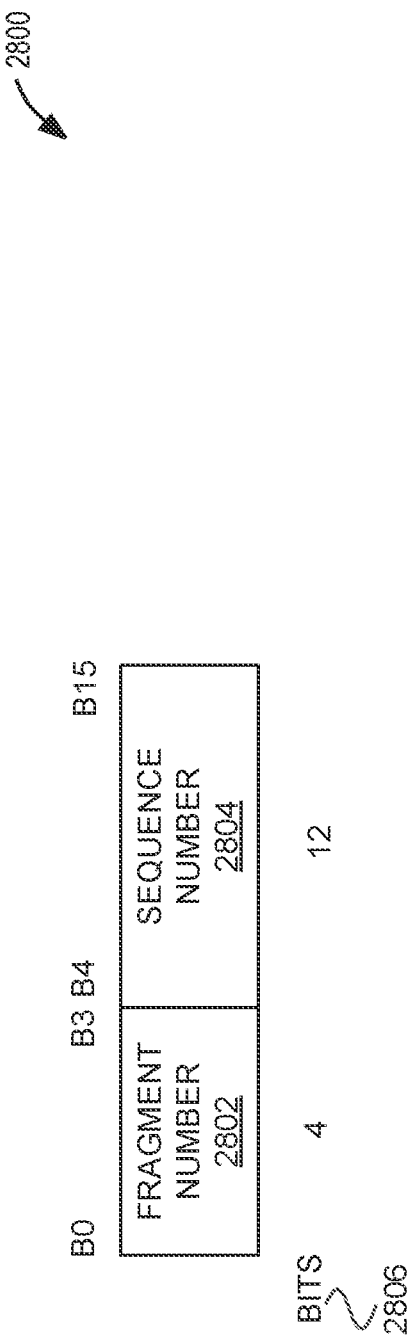
FIG. 28 illustrates a sequence control field, in accordance with some embodiments.

FIG. 28 illustrates a sequence control field 2800, in accordance with some embodiments. Illustrated in FIG. 28 is fragment number field 2802, sequence number field 2804, and bits 2806. One or more of the fields of sequence control field 2800 may be optional. Sequence control field 2800 may include one or more additional fields.

In some embodiments, the sequence number space range (e.g., a largest number representable by sequence number field 2804) is extended when the negotiated buffer size is larger than 2048. In some embodiments a sequence number extension field is included in the multi-band fields 2308, 2902. In accordance with some embodiments the indicated sequence number is determined by Value_indicated_by_the_Sequence_number_field (e.g., sequence number 2804)+4096*(value indicated in the extension field). In some embodiments, one or more bits of fragment number 2802 are used for the sequence number extension field. In some embodiments, a BlockAck variant includes the sequence number extension field. For example, the legacy BlockAck frame is modified with values assigned to B1, B2, B3, and B4 of BA type to define the following entries. One entry can be defined for EHT compressed BlockAck with indication for larger BA bitmap size. One entry can be defined for EHT Multi-STA BlockAck with indication for larger BA bitmap size. One entry can be defined for EHT Multi-TID BlockAck with indication for larger BA bitmap size. One entry can be defined for EHT GCR BlockAck with indication for larger BA bitmap size.

In some embodiments, sequence number field 2804 is extended to larger number of bits than 12. To differentiate the sequence number field 2804 with size 12 bits and the larger size sequence number field 2804, the STA 504 and AP 502 agree to have extension of sequence number space through negotiation and reuse sequence control field 2800, in accordance with some embodiments. In some embodiments, the negotiation uses ADDBA request/response with fields to indicate the extended sequence number space. TA/RA that match the negotiated address of the interface is then the indication for larger sequence number field in data, BAR and block ack. A data frame, BlockAck variant, BlockAckReq variant, MU-BAR variant, GCR MU-BAR variant are defined to include a new sequence number field.

For the data frame, the type field can indicate 11 for extension, and one or more entries of the subtype field can indicate the data frame with extended sequence number field. The table for valid types and subtypes for the frame control field may be modified to accommodate one or more of the data frame, BlockAck variant, BlockAckReq variant, MU-BAR variant, GCR MU-BAR that accommodate the larger sequence numbers.

Some embodiments expand the Block Ack Action frame negotiation procedure to accommodate multi-band buffer management. Some embodiments provide one or more of the following during negotiation to facilitate multi-band buffer management. Interface information including operating class, channel number, MAC address of both sides, indication of the maximum BA bitmap size of the interface, and/or buffer sharing indication for the interface. Some embodiments include information following packets: Multi-band element, a new element, and an ADDBA extension element. Some embodiments increase the maximum buffer size indicated by ADDBA negotiation. Some embodiments extend the meaning of Block Ack Timeout Value field for multi-band buffer management.

In some embodiments, embodiments disclosed herein is compatible to existing BA negotiation signaling, for device 1 2302.1 and device 2 2302.2 using links 2304. Some embodiments disclosed herein are compatible with more than two links 2304. Some embodiments identify different interfaces or links 2304. Some embodiments increase the buffer size limit for aggregation to accommodate the links 2304.

Some embodiments include one or more of the following for multi-band (e.g., multi-band buffer 2306) fields 2308 in an ADDBA request/response frame (e.g., BAR field 2200), in a capabilities element (e.g., EHT capabilities element), or another frame. One or more multi-band fields 2308 to indicate information of operating band/channel for each interface (e.g., 806, 2304). One or more multi-band fields 2308 to indicate an operating class, channel number, and Band ID. One or more multi-band fields 2308 to indicate TIDs that are operation on each channel. One or more multi-band fields 2308 to indicate STA address information for each interface (e.g., 806, 2304). The indication of the STA address may be a MAC address including the STA that transmits data (originator) in the interface and the STA that receives data (recipient) in the interface, in accordance with some embodiments. One or more multi-band fields 2308 to indicate maximum BA bitmap size for each interface (e.g., 806, 2304). The maximum BA bitmap size for each interface may be used by a STA 504 that transmits data on the interface to determine the required network availability vector (NAV) reservation for the Block Ack response.

One or more multi-band fields 2308 to indicate buffer sharing indication for each interface. In some embodiments, when the indication is set, it means that the band/channel indicated for an interface shares the same transmit buffer or/and receiving reordering buffer. The band/channel that the ADDBA request/response is transmitted on can be included in the sharing operation. In some embodiments, data (e.g., MPDUs) transmission can happen in different interfaces (e.g., 806, 2304) and one common transmission buffer and receiving reordering buffer (e.g., multi-band buffer 2306) is used.

In some embodiments, the multi-band fields 2308, which may include information for multi-band buffer management may be included in one or more of the following. An extension of multi-band element format 2500, where each multi-band element represents one interface (e.g., 806, 2304). The multi-band element format 2500 includes band ID field 2508, operating class field 2510, channel number field 2512, and STA MAC address field 2424. The multi-band element format 2500 may include one or more of the following: peer STA MAC address of the interface, TIDs that are used in this interface, buffer sharing indication, maximum BA bitmap indication. In some embodiments, reserved bits in Multi-band control field 2506 are used for the indication of one or more of the multi-band fields 2308. In some embodiments, more than one multi-band element 2500 is be included in ADDBA request/response, where each multi-band element 2500 represents different interfaces (e.g., 806, 2304).

In some embodiments, the following is used for Source address field and Destination address field for the ADDBA request/response. The following rules for establishment of a multi-band block ack agreement shall apply:

a) If the TA and/or the RA fields of the ADDBA Request frame are different from the originator MAC address and/or the recipient MAC address, respectively, used in the channel and band where the block ack agreement should operate, then the originator shall set the Source Address field and the Destination Address field of the classifier to the originator MAC address and the recipient MAC address, respectively, to be used in the band and channel indicated in any of the Multi-band element included in the ADDBA Request frame.

b) If the TA and RA are equal to all the originator MAC address and the recipient MAC address, respectively, then the Multi-band element, if any, included in the ADDBA Request frame shall indicate the band and channel over which the established block ack agreement is operating. The TCLAS element shall not be included in this ADDBA Request frame.

c) The Multi-band element should not be included in the ADDBA Request frame if in the case b) the ADDBA Request frame is issued in the same band and channel over which the block ack agreement shall operate.

d) If the TA and/or the RA fields of the ADDBA Response frame are different from the recipient MAC address and/or the originator MAC address, respectively, to be used in the channel and band where the block ack agreement should operate, then the recipient shall set the Source Address field and the Destination Address field of the classifier to the recipient MAC Address and the originator MAC address, respectively, to be used in the band and channel indicated in any of the Multi-band element included in the ADDBA Response frame. The indicated band and channel shall be equal to the band and channel indicated in the Multi-band element of the ADDBA Request frame.

e) If the TA and RA fields are equal to all the recipient MAC address and the originator MAC address, respectively, then the Multi-band element, if any, included in the ADDBA Response frame shall indicate the band and channel over which the established block ack agreement is operating. The indicated band and channel shall be equal to the band and channel indicated in the Multi-band element of the ADDBA Request frame. The TCLAS element shall not be included in the ADDBA Response frame.

f) The Multi-band element should not be included in the ADDBA Response frame if in case e) the ADDBA Response frame is issued in the same band and channel over which the block ack agreement, if established, shall operate In some embodiments, the ADDBA extension element 2700 may include one or more of the multi-band fields 2308, e.g., information of each interface can be included, information of just the interface used to transmit and receive ADDBA request/response can be included. In some embodiments reserved bit in ADDBA Capabilities field 2706 are used for the indication of some of the information of the multi-band fields 2308. Extended field 2708 may include one or more of the multi-band fields 2308.

Figure 29:
FIG. 29 illustrates an element for multi-band fields, in accordance with some embodiments.

FIG. 29 illustrates an element for multi-band fields 2900, in accordance with some embodiments. The element for multi-band fields 2900 may include one or more of the multi-band fields 2902. Multi-band fields 2902 may be one or more of the fields of multi-band fields 2308. The element for multi-band fields 2900 is included in ADDBA request/response, in accordance with some embodiments. In some embodiments, element for multi-band fields 2900 is repeated for each interface. In some embodiments, more than one new element can be included in ADDBA request/response.

In some embodiments, one of the fields of the multi-band fields 2308, 2902 jointly indicates the buffer size in ADDBA request/response negotiation. The maximum size indicated in the buffer size field of the block ack parameter set is 1023. The indicated buffer size is equal to Value_indicated_in-_Buffer_size_field+1024*(value_indicated_in_the_extended field). The size of the buffer size additional field (of multi-band fields 2308, 2902) is one bit, in accordance with some embodiments. In some embodiments, because the sequence number range (4096) of MPDUs, the maximum feasible buffer size is 2048. The size of the buffer size additional field (of multi-band fields 2308, 2902) is more than one bit, in accordance with some embodiments. In some embodiments, the sequence number range of 4096 of MPDUs is extended. In some embodiments, the buffer size additional field is included in the ADDBA capabilities field of the ADDBA extension element, e.g., the buffer size additional field may be part of extended filed 2708.

In some embodiments, the Block Ack Timeout Value field contains the duration, in TUs, after which the block ack setup is terminated, if there are no frame exchanges within this duration using this block ack agreement. A value of 0 disables the timeout. In some embodiments, the meaning of Block Ack Timeout value field is the duration, in TUs, after which the block ack setup is terminated, if there are no frame exchanges within this duration in any negotiated interface using this block ack agreement. A value of 0 disables the timeout. Separate Block Ack Timeout value field can be indicated for each interface. In some embodiments, the Block Ack Timeout Value field contains the duration, in TUs, after which the block ack setup is terminated for the corresponding interface, if there are no frame exchanges within this duration in the corresponding interface using this block ack agreement. A value of 0 disables the timeout.

Figure 30:
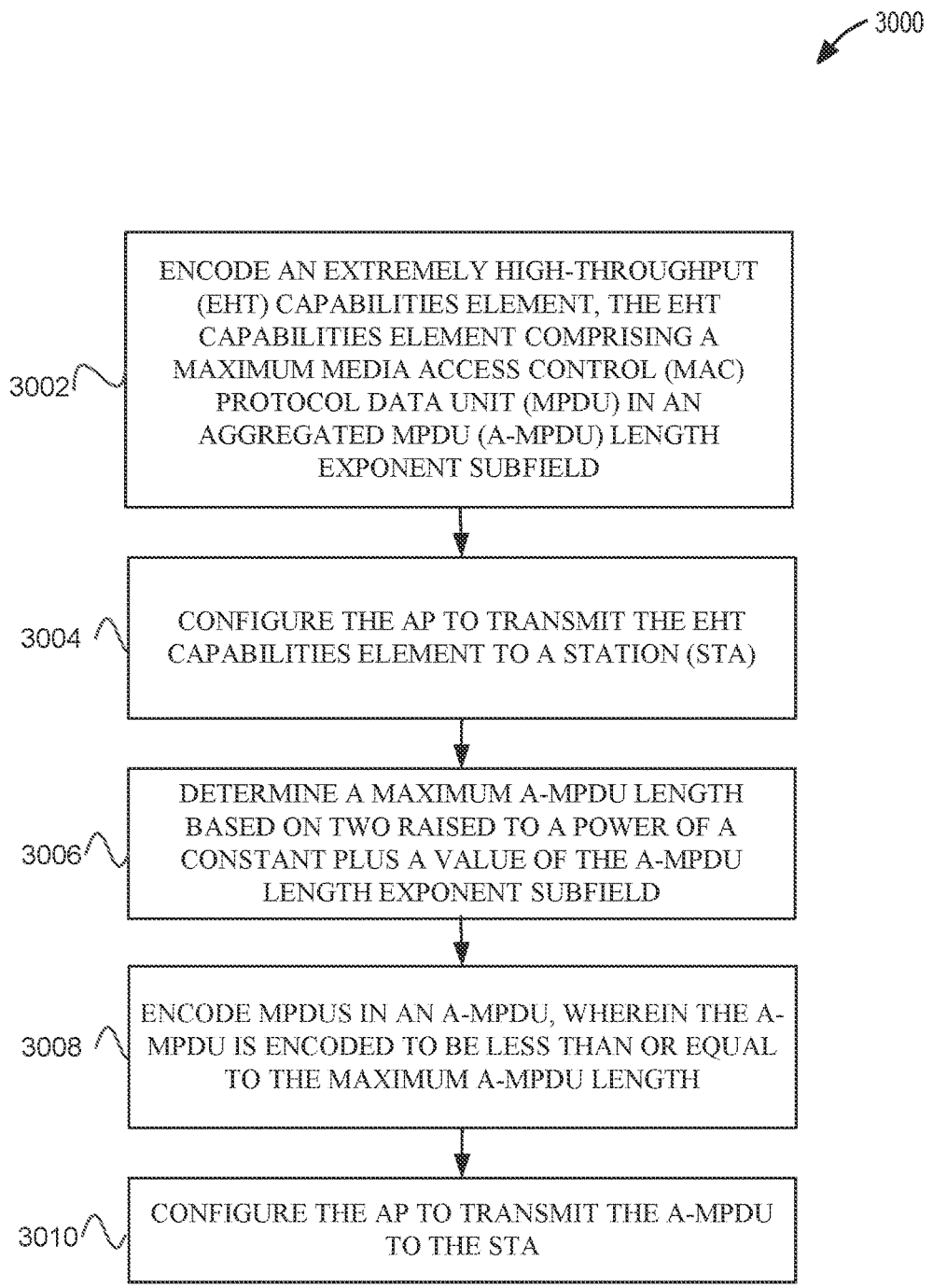
FIG. 30 illustrates a method for extreme high throughput physical layer date rate, in accordance with some embodiments.

FIG. 30 illustrates a method 3000 for extreme high throughput physical layer date rate, in accordance with some embodiments. The method 3000 begins at operation 3002 with encoding an EHT capabilities element, the EHT capabilities element comprising a maximum MPDU in an A-MPDU length exponent subfield. For example maximum A-MDPU length exponent extension 1302 may be included in EHT capabilities element 1400. The method 3000 may continue at operation 3004 with configuring the AP to transmit the EHT capabilities element to a STA. For example, EHT AP 502 may transmit the EHT capabilities element 1400 as part of transmission 1502. The method 3000 may continue at operation 3006 with determining a maximum A-MPDU length based on two raised to a power of a constant plus a value of the A-MPDU length exponent subfield. For example, EHT STA 504 or EHT AP 502 may determine the A-MDPU length as disclosed herein. The method 3000 may continue at operation 3008 with encoding MPDUs in an A-MPDU, wherein the A-MPDU is encoded to be less than or equal to the maximum A-MPDU length. For example, EHT STA 504 and EHT AP 502 may encode a A-MDPU 900 as disclosed herein. The method 3000 may continue at operation 3010 with configuring the AP to transmit the A-MPDU to the STA. For example, an apparatus of the EHT AP 502 may configure the EHT AP 502 to transmit the A-MPDU to the STA (e.g., EHT STA 504).

Figure 31:
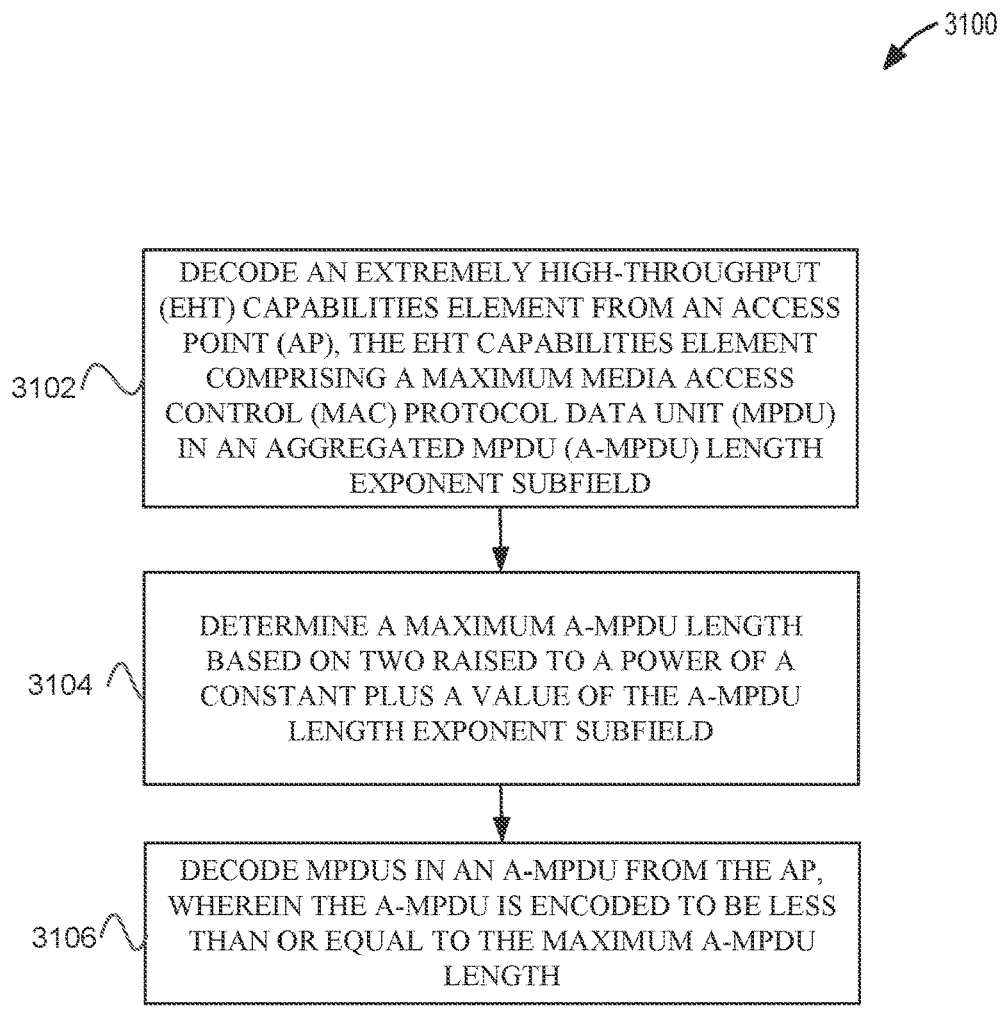
FIG. 31 illustrates a method for extreme high throughput physical layer date rate, in accordance with some embodiments.

FIG. 31 illustrates a method 3100 for extreme high throughput physical layer date rate, in accordance with some embodiments. The method 3100 begins at operation 3002 with decoding an EHT capabilities element from an AP, the EHT capabilities element comprising a maximum MPDU in an A-MPDU length exponent subfield. For example, EHT STA 502 may decode EHT capabilities element 1400, which may include A-MDPU length exponent extension 1302. The method 3100 may continue at operation 3104 with determining a maximum A-MPDU length based on two raised to a power of a constant plus a value of the A-MPDU length exponent subfield. For example, EHT STA 504 may determine a maximum A-MDPU length as disclosed herein. The method 3100 may continue at operation 3106 with decoding MPDUs in an A-MPDU from the AP, where the A-MPDU is encoded to be less than or equal to the maximum A-MPDU length. For example, EHT STA 504 may encode A-MPDU 900 as disclosed herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a multi-link device (MID) configured for multi-link operation, the apparatus comprising: processing circuitry; and memory, the processing circuitry configured to:
    establish a plurality of links with another MLD;
    use a single medium access control (MAC) address for transmission of MAC protocol data units MPDUs across the links:
    negotiate a block acknowledge (BA) agreement with the other MLD by exchanging add BA (ADDBA) frames, the BA agreement negotiated for a traffic identifier (TID) and applicable to each of the links of the plurality;
    wherein to negotiate the BA agreement, a BA bitmap size is determined,
    encode MPDUs for transmission over the links to the other MILD, the MPDUs encoded for transmission in accordance with the BA agreement for the TID; and
    decode a BA frame received from the other MLD that acknowledges the transmitted MPDUs.

2. The apparatus of claim 1, wherein the BA frame includes a BA bitmap subfield that includes the BA bitmap, and
    wherein a size of the BA bitmap subfield is indicated in a fragment number subfield of a BA starting sequence control field of the BA frame.

3. The apparatus of claim 2, wherein the negotiated BA agreement includes a determined BA bitmap size of 1024 bits.

4. The apparatus of claim 3, wherein the MIL is a logical entity comprising two or more extremely high throughput (EHT) stations (STAs).

5. The apparatus of claim 4, wherein the size of the BA bitmap subfield of the BA frame corresponds to the BA bitmap size of the negotiated BA agreement.

6. The apparatus of claim 5, wherein the TID corresponding to the BA agreement is mapped to each of the links of the plurality.

7. The apparatus of claim 6, wherein to negotiate the BA agreement, the BA bitmap size is selected from a plurality of predetermined sizes, and
    wherein the negotiated BA agreement includes the determined BA bitmap size of 1024 bits for a negotiated buffer size.

8. The apparatus of claim 7, wherein the BA agreement negotiated for a single traffic identifier (TID).

9. The apparatus of claim 2, wherein the MILD is a logical entity comprising two or more extremely high throughput (EHT) access point (AP) stations (STAs), and
    wherein the other MLD is a logical entity comprising two or more other EHT non-AP STAs.

10. The apparatus of claim 9, wherein the MILD is configured to use the single MAC address for transmission of aggregate MPDUs (A-MPDUs) across the links.

11. The apparatus of claim 9, wherein the memory is configured to store an indicator of the BA bitmap size.

12. A non-transitory computer-readable storage medium that stores instructions for execution by processing circuitry of a multi-link device (MLD) configured for multi-link operation, the processing circuitry configured to:
    establish a plurality of links with another MLD;
    use a single medium access control (MAC) address for transmission of MAC protocol data units MPDUs across the links;
    negotiate a block acknowledge (BA) agreement with the other MILD by exchanging add BA (ADDBA) frames, the BA agreement negotiated for a traffic identifier (TID) and applicable to each of the links of the plurality;
    wherein to negotiate the BA agreement, a BA bitmap size is determined,
    encode MPDUs for transmission over the links to the other MLD, the MPDUs encoded for transmission in accordance with the BA agreement for the TM; and
    decode a BA frame received from the other MLD that acknowledges the transmitted MPDUs.

13. The non-transitory computer-readable storage medium of claim 12, wherein the BA frame includes a BA bitmap subfield that includes the BA bitmap, and
    wherein a size of the BA bitmap subfield is indicated in a fragment number subfield of a BA starting sequence control field of the BA frame.

14. The non-transitory computer-readable storage medium of claim 13, wherein the negotiated BA agreement includes a determined BA bitmap size of 1024 bits.

15. The non-transitory computer-readable storage medium of claim 14, wherein the MLD is a logical entity comprising two or more extremely high throughput (EHT) stations (STAs).

16. The non-transitory computer-readable storage medium of claim 15, wherein the size of the BA bitmap subfield of the BA frame corresponds to the BA bitmap size of the negotiated BA agreement.

17. The non-transitory computer-readable storage medium of claim 16, wherein the TID corresponding to the BA agreement is mapped to each of the links of the plurality.

18. The non-transitory computer-readable storage medium of claim 17, wherein to negotiate the BA agreement, the BA bitmap size is selected from a plurality of predetermined sizes, and wherein the negotiated BA agreement includes the determined BA bitmap size of 1024 bits for a negotiated buffer size.

19. The non-transitory computer-readable storage medium of claim 18, wherein the BA agreement negotiated for a single traffic identifier (TID).

20. The non-transitory computer-readable storage medium of claim 13, wherein the MLD is a logical entity comprising two or more extremely high throughput (EHT) access point (AP) stations (STAs), and
wherein the other MLD is a logical entity comprising two or more other EHT non-AP STAs.

* * * * *

UNITED STATES PATENT AND TRADEMARK OFFICE
CERTIFICATE OF CORRECTION

PATENT NO. : 11,503,605 B2  
APPLICATION NO. : 17/151729  
DATED : November 15, 2022  
INVENTOR(S) : Huang et al.

Page 1 of 1

It is certified that error appears in the above-identified patent and that said Letters Patent is hereby corrected as shown below:

In the Claims

In Column 29, Line 37, in Claim 1, delete "(MID)" and insert --(MLD)-- therefor

In Column 29, Line 44, in Claim 1, delete "links:" and insert --links;-- therefor In Column 29, Line 52, in Claim 1, delete "MILD," and insert --MLD,-- therefor In Column 29, Line 65, in Claim 4, delete "MIL" and insert --MLD-- therefor In Column 30, Line 15, in Claim 9, delete "MILD" and insert --MLD-- therefor In Column 30, Line 20, in Claim 10, delete "MILD" and insert --MLD-- therefor In Column 30, Line 34, in Claim 12, delete "MILD" and insert --MLD-- therefor In Column 30, Line 41, in Claim 12, delete "TM;" and insert --TID;-- therefor In Column 31, Line 8, in Claim 20, delete "MILD" and insert --MLD-- therefor Signed and Sealed this  
Twenty-ninth Day of August, 2023

Katherine Kelly Vidal  
*Director of the United States Patent and Trademark Office*